(12) United States Patent
Helweg-Larsen et al.

(10) Patent No.: US 11,258,958 B2
(45) Date of Patent: Feb. 22, 2022

(54) IMAGE CAPTURE

(71) Applicant: EXPODO LIMITED, Oxford (GB)

(72) Inventors: Tim Helweg-Larsen, Oxfordshire (GB); Mariska Helweg-Larsen, Oxfordshire (GB)

(73) Assignee: EXPODO LIMITED, Oxford (GB)

(*) Notice: Subject to any disclaimer, the term of this patent is extended or adjusted under 35 U.S.C. 154(b) by 0 days.

(21) Appl. No.: 16/617,615

(22) PCT Filed: May 30, 2018

(86) PCT No.: PCT/GB2018/051472
§ 371 (c)(1),
(2) Date: Nov. 27, 2019

(87) PCT Pub. No.: WO2018/220369
PCT Pub. Date: Dec. 6, 2018

(65) Prior Publication Data
US 2020/0186695 A1    Jun. 11, 2020

(30) Foreign Application Priority Data

May 30, 2017 (GB) .................................. 1708572

(51) Int. Cl.
*H04N 5/225* (2006.01)
*H04N 5/232* (2006.01)
*H04N 5/235* (2006.01)

(52) U.S. Cl.
CPC ......... *H04N 5/2354* (2013.01); *H04N 5/2353* (2013.01); *H04N 5/232933* (2018.08); *H04N 5/232939* (2018.08)

(58) Field of Classification Search
CPC ........... H04N 5/2354; H04N 5/232939; H04N 5/232933; H04N 5/2353; H04N 5/232; H04N 5/23216
See application file for complete search history.

(56) References Cited

U.S. PATENT DOCUMENTS 6,614,456 B1 *   9/2003   Rzepkowski ....... G06F 3/04847
                                                           715/771
2004/0042791 A1 * 3/2004   Suekane ............ H04N 5/23293
                                                           396/661

(Continued)

OTHER PUBLICATIONS

Melih, "Interactive Donut Chart", Jun. 8, 2014, XP055494067, http://beatexcel.com/interactive-donut-chart/.

(Continued)

*Primary Examiner* — Abdelaaziz Tissire
(74) *Attorney, Agent, or Firm* — Meunier Carlin & Curfman LLC

(57) ABSTRACT

There is provided a feedback and control method of operating a device. The method seeks to minimise cognitive load on a user, including novice users, and seeks to enable efficient, competent control of a device, and informed selection of and between optimum configurations. The method comprises determining values that are representative of each of a plurality of variables, representing each of the variables on a display using a display component, wherein a dimension of each display component is proportional to the value that is representative of the corresponding variable, and wherein the display components representing each of the variables are arranged substantially contiguously such that when the sum of the values is equal to a pre-defined constant (X) the substantially contiguously arranged display components extend between an origin point on the display and a target end point on the display, receiving an input that changes one of the values and consequentially adjusting the corresponding display component.

23 Claims, 13 Drawing Sheets

(56) References Cited

U.S. PATENT DOCUMENTS

| | | | | |
|---|---|---|---|---|
| 2008/0122949 | A1* | 5/2008 | Kindborg | H04N 5/23216 348/231.99 |
| 2009/0153527 | A1* | 6/2009 | Paczkowski | G06F 3/04847 345/184 |
| 2010/0296806 | A1* | 11/2010 | Seo | H04N 5/23216 396/236 |
| 2011/0050923 | A1* | 3/2011 | Nomura | H04N 5/2257 348/208.99 |
| 2012/0086846 | A1 | 4/2012 | Fuh et al. | |
| 2013/0163659 | A1 | 6/2013 | Sites | |
| 2015/0301691 | A1* | 10/2015 | Qin | G06F 3/0481 715/772 |
| 2015/0350504 | A1* | 12/2015 | Corcoran | H04N 9/64 348/211.99 |
| 2016/0127638 | A1* | 5/2016 | Guo | H04N 5/23293 348/333.02 |
| 2016/0134845 | A1 | 5/2016 | Asai | |
| 2016/0239195 | A1* | 8/2016 | Takahashi | G06T 11/206 |
| 2016/0239196 | A1 | 8/2016 | Takahashi et al. | |
| 2016/0286139 | A1* | 9/2016 | Tsuchiya | G06F 3/04845 |
| 2017/0041527 | A1* | 2/2017 | Pettersson | H04N 5/2356 |
| 2017/0094157 | A1* | 3/2017 | Shinozaki | H04N 5/23293 |
| 2018/0007260 | A1* | 1/2018 | Fukui | H04N 5/23222 |
| 2019/0253628 | A1* | 8/2019 | Misawa | G06F 3/0416 |
| 2020/0007756 | A1* | 1/2020 | Tsuchiya | H04N 5/2352 |
| 2020/0412974 | A1* | 12/2020 | Ikegami | H04N 5/232933 |

OTHER PUBLICATIONS

Surur, "Lumia Camera 5 brings super-low ISO to the Nokia Lumia 1520", Jan. 10, 2015, pp. 1-9, XP055494032, https://mspoweruser.com/lumia-camera-5-brings-super-low-iso-to-the-nokia-lumia-1520/.

Search Report for Application No. GB1708572.1 dated Nov. 20, 2017.

International Search Report and Written Opinion for International Application No. PCT/GB2018/051472, dated Jul. 30, 2018.

International Preliminary Report on Patentability for International Application No. PCT/GB2018/051472, dated Sep. 16, 2019.

Written Opinion of the International Preliminary Examining Authority for International Application No. PCT/GB2018/051472, dated May 10, 2019.

* cited by examiner

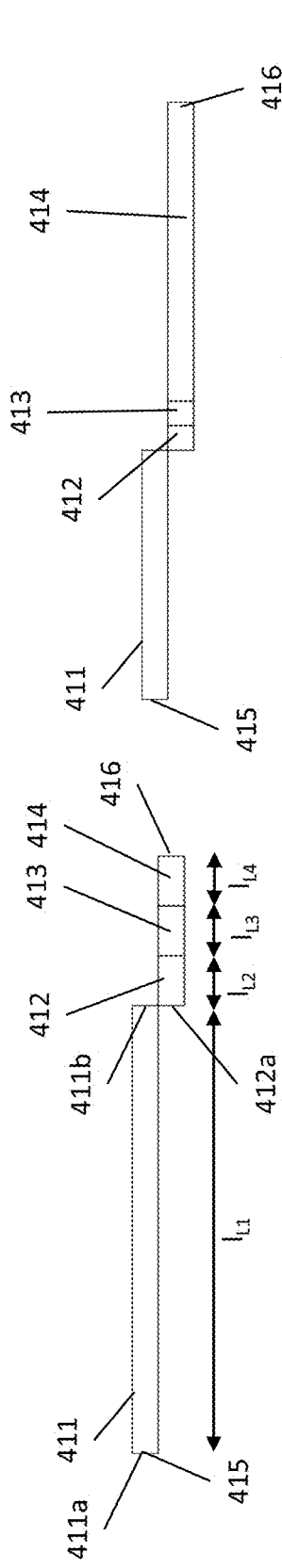
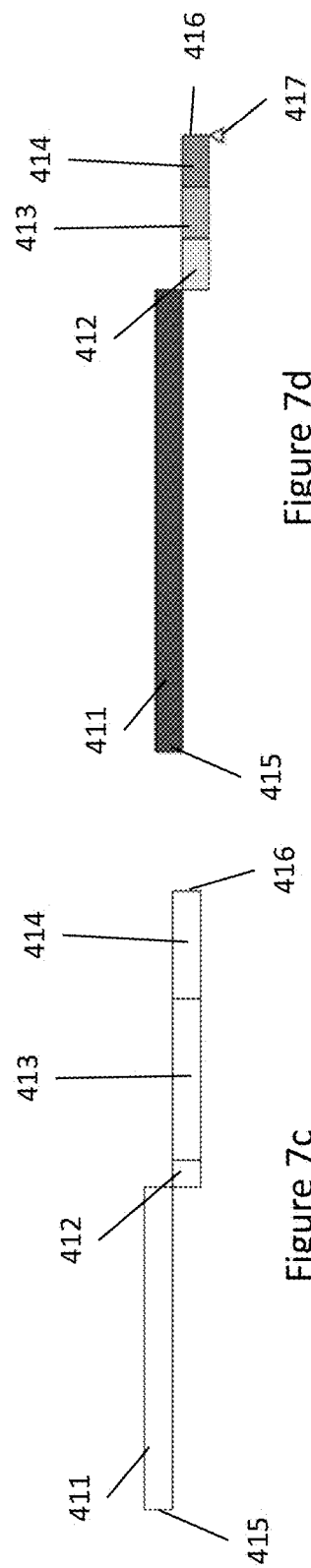

| Luminance | | Sensitivity | | Aperture | | Time | |
|---|---|---|---|---|---|---|---|
| cd/m² | Lr | ISO | Sr | f/ | Ar | sec | Tr |
| 0.004 | -2 | 25 | -2 | 45 | -2 | 1/16000 | -2 |
| 0.008 | -1 | 50 | -1 | 32 | -1 | 1/8000 | -1 |
| 0.016 | 0 | 100 | 0 | 22 | 0 | 1/4000 | 0 |
| 0.031 | 1 | 200 | 1 | 16 | 1 | 1/2000 | 1 |
| 0.063 | 2 | 400 | 2 | 11 | 2 | 1/1000 | 2 |
| 0.125 | 3 | 800 | 3 | 8 | 3 | 1/500 | 3 |
| 0.25 | 4 | 1600 | 4 | 5.6 | 4 | 1/250 | 4 |
| 0.5 | 5 | 3200 | 5 | 4 | 5 | 1/125 | 5 |
| 1 | 6 | 6400 | 6 | 2.8 | 6 | 1/60 | 6 |
| 2 | 7 | 12800 | 7 | 2 | 7 | 1/30 | 7 |
| 4 | 8 | 25600 | 8 | 1.4 | 8 | 1/15 | 8 |
| 8 | 9 | 51200 | 9 | 1 | 9 | 1/8 | 9 |
| 16 | 10 | 102400 | 10 | | | 1/4 | 10 |
| 32 | 11 | 204800 | 11 | | | 1/2 | 11 |
| 64 | 12 | 409600 | 12 | | | 1 | 12 |
| 128 | 13 | 819200 | 13 | | | 2 | 13 |
| 256 | 14 | 1638400 | 14 | | | 4 | 14 |
| 512 | 15 | | | | | 8 | 15 |
| 1024 | 16 | | | | | 15 | 16 |
| 2048 | 17 | | | | | 30 | 17 |
| 4096 | 18 | | | | | 60 | 18 |
| 8192 | 19 | | | | | | |

Figure 14

IMAGE CAPTURE

TECHNICAL FIELD

The present invention relates to methods of operating devices providing a feedback and control method, seeking to mitigate cognitive load on a user, including novice users, and seeking to enable efficient, competent control of a device, and informed selection of and between optimum configurations. In particular the present invention can be applied to image capture devices, but other devices are able to utilise a feedback and control input provided.

BACKGROUND

Devices are typically provided with user controls and display screens. Sometimes the controls are physical controls in the form of for example knobs, buttons and dials. Sometimes the controls are virtual, for example displayed on a touchscreen. It is also possible to provide a mix of virtual and physical controls. Display screens can be provided to simply display information or to receive inputs as well as display information (e.g. using a touchscreen). Typically feedback on the controls selected by a user is provided by physical indications in respect of physical controls (for example using markings such as spaced lines, or numbers, or icons) and on a display (for example by dynamically varying graphics on a screen or by a simple display of numbers, characters or icons).

A good example of a device providing such user controls and display screens is an image capture device, for example such as a still-image camera or video camera.

An image capture device is device for capturing images that may be stored locally, transmitted to another location, or both. The images may be individual still photographs or sequences of images constituting videos or movies.

The term "image capture device", as used herein, therefore refers to any device that can be used to capture an image of a scene (i.e. that is within a field of view of the image capture device) and the term is used herein to include photographic still cameras that use either film or electronic image sensors, digital cameras, video or movie cameras, camcorders, telescopes, microscopes, endoscopes, virtual cameras (used within virtual environments), computing devices with built-in cameras (including smartphones, smart watches, smart glasses, tablets, laptops, desktops), imaging devices using computational imaging techniques to combine the output of multiple cameras into a single image or sequence of images constituting videos or movies, etc.

FIG. 1 illustrates schematically a conventional image capture device 10 comprising an enclosure 11, a lens 12, an optical diaphragm 13 defining an aperture 14, a shutter 15 and an image sensor 16. The lens 12 focuses the light reflected or emitted from objects that make up a scene that is within a field of view of the image capture device onto the image sensor 16. The shutter 15 controls the length of time that light can enter the image capture device 10. The size of the aperture 14 defined by the optical diaphragm 13 regulates the amount of light that passes through the lens 12 and controls the depth of field, which is the distance between the nearest and farthest objects in a scene that appear to be in focus. Reducing the size of the aperture 14 increases the depth of field, and conversely increasing the size of the aperture 14 decreases the depth of field. Depending upon the type of image capture device, the image sensor 16 will be either a light-sensitive material (e.g. photographic film) or an electronic image sensor (e.g. a charge-coupled device (CCD) image sensor or an active-pixel sensor (APS)/CMOS image sensor).

The variable attributes of an image capture device that impact on the image captured therefore comprise the size of the aperture, the shutter speed/exposure time, and the sensitivity the image sensor. Whilst some simple forms of image capture devices, such as disposable cameras, provide little to no control over these attributes, more sophisticated image capture devices, such as digital single-lens reflex (DSLR) cameras, provide means for the user to control each of these attributes. However, in such devices each of these attributes is controlled independently of the others, with the only feedback being provided by the independent display of representative values for each of these variables. Even when these devices provide a semi-automated mode, in which a change in one of these variable attributes by the user results in an automatic, consequential change in one of the other attributes, the image capture device provides no direct, intuitive feedback as to the effect that this consequential change will have on the image to be captured.

By way of example, conventional digital SLR and mirrorless cameras typically allow the user to choose between manual, semi-automatic and automatic exposure modes. In manual mode all of the cameras exposure settings are controlled independently of one another by the user, whilst in automatic mode all of the cameras exposure settings are controlled by the camera's internal processing. The semi-automatic mode then typically has various sub-modes, including:
  Aperture Priority mode—in which the user sets the aperture and ISO values and the cameras internal processing sets the shutter speed so as to achieve a 'correct exposure';
  Shutter Priority mode—in which the user sets the shutter speed and ISO values and the cameras internal processing sets aperture so as to achieve a 'correct exposure'; and
  Program mode—in which the user sets ISO value and one of the aperture and shutter speed, and the cameras internal processing then sets the other of the aperture or shutter speed to compensate and achieve a 'correct exposure'.

Consequently, when a user wishes to operate in semi-automatic mode they must take a minimum of two exposure setting operations before the shutter can be pressed. Specifically, the user must change the camera into the desired semi-automatic mode, and then set the one or both of the variables that will not be automatically set by the cameras internal processing.

In addition, the representative values used for these variable attributes have no immediately apparent correlation with their effect on the captured image, and it therefore requires the user to have significant knowledge and/or prior experience in order for them to know whether the particular combination of values selected is likely to capture a suitable image.

Specifically, on conventional image capture devices that provide user control of these attributes, the aperture size is represented using an f-number, or relative aperture, which is the ratio of the lens's focal length (f) to the diameter of the aperture (D). Consequently, an increase in the aperture diameter that leads to an increase in the amount of light reaching the image sensor, and therefore a consequential increase in the luminance of the captured image, involves decreasing the f-number displayed on the image capture device. The aperture controls on conventional image capture devices are also configured to adjust the aperture diameter in discrete steps, known as stops, where each stop increases or decreases the f-number by a factor of approximately √2. For example, a standard scale provides values of f/1, f/1.4, f/2, f/2.8, f/4, f/5.6, f/8, f/11, f/16, f/22, f/32, f/45, f/64, f/90, f/128, etc.

The shutter speed, or exposure time, is the length of time that the image sensor is exposed to light during image capture and is represented by the value in seconds. The amount of light that reaches the image sensor is proportional to the exposure time. Consequently, an increase in the exposure time that would lead to an increase in the amount of light reaching the image sensor, and therefore a consequential increase in the luminance of the captured image, involves increasing the exposure time displayed on the image capture device. The shutter speed controls on conventional image capture devices are also configured to adjust the shutter speed in discrete steps, with a standard image capture device providing a shutter speed scale of 1/1000, 1/500, 1/250, 1/125, 1/60, 1/30, 1/15, 1/8, 1/4 etc.

The sensitivity of the image sensor is conventionally represented using a numerical scale defined by the International Organization for Standardization (ISO) (e.g. ISO 5800:2001 for colour negative film and ISO 12232:2006 for digital still-cameras). For example, a typical image capture device will provide an ISO sensitivity scale of 100, 200, 400, 800, and 1600 as a minimum. The higher the number, the more sensitive the image sensor is to light. Consequently, an increase in the sensitivity, which would lead to a consequential increase in the luminance of the captured image, involves increasing the ISO sensitivity value displayed on the image capture device. These values are also relative to one another, so ISO 200 is twice as sensitive as ISO 100, and ISO 800 is four times as sensitive as ISO 200, and so on.

Furthermore, the variables that impact on the image captured by an image capture device comprise these attributes of the image capture device but also other external factors/conditions that affect the amount/intensity of the light that reaches the image sensor (i.e. the image plane illuminance). In particular, the image to be captured is affected by external factors/conditions such as the scene luminance ($L_v$) (i.e. the intensity of the light reflected or emitted by the scene), which is not directly and intuitively displayed on conventional image capture devices. Indeed, consideration for the affect of scene luminance is usually incorporated into the photography process by the use of a light meter (either internal or external). Light meters determine a measure of the scene luminance and use this as an input into an exposure equation to provide the user with recommended values for the aperture size, the shutter speed, and the sensitivity of the image capture device.

Consequently, there are various problems that arise from the way in which conventional image capture devices represent, provide feedback on, and provide control of the variables that impact on an image to be captured. In particular, these factors make the control of an image capture device by the user complex and unintuitive, and provide users with limited effective control of the image capture process as they rely heavily on the user having significant understanding and experience to be able to select image variables that both produce a 'correct exposure' and achieve the user's preferred trade-off between grain blur (which positively correlates with the sensitivity of the image sensor), motion blur (which positively correlates with the exposure time), and depth of field/background blur (which positively correlates with the aperture size), these being the consequential secondary effects of the exposure variables.

SUMMARY

Accordingly, various aspects and/or embodiments provide methods of operating devices such as an image capture device and devices, including image capture devices, that provide for an improved image capture process by seeking to minimise the risk that the captured image will have an undesirable exposure/image luminance whilst allowing the user substantially full and intuitive control of the image capture device attributes. The methods described herein provide the user of an image capture device with intuitive control of and feedback on each individual image variable and their combined impact on the image to be captured. These methods also devices such as enable image capture devices to make use of simplified user controls and simplified displays, as well as simplifying the use of peripheral controls and/or display for devices such as image capture devices.

Therefore, according to a first aspect there is provided a feedback and control method of operating a device, the method comprising:

determining values that are representative of each of a plurality of variables;

representing each of the variables on a display using a display component, wherein a dimension of each display component is proportional to the value that is representative of the corresponding variable, and wherein the display components representing each of the variables are arranged substantially contiguously such that when the sum of the values is equal to a pre-defined constant (X) the substantially contiguously arranged display components extend between an origin point on the display and a target end point on the display; and receiving an input that changes one of the values that is representative of one of the variables and consequentially adjusting the corresponding display component.

Optionally, the device is an image capture device operable to capture an image of a scene. Such devices are typically supplied with a range of configurable options, which can be advantageous to control using the method.

Optionally, one or more of the plurality of variables comprise image variables. If an image capture device is being used, then the control of image variables is likely to be a useful feature.

Optionally, the method as disclosed herein further comprises the capturing of an image using the image variables as changed by the receiving of the input. The image variables, and hence the control options associated therewith, may be liable to vary according to the subject of the image being captured.

Optionally, in order to provide that the captured image has a target image luminance/brightness (chosen as desirable), the pre-defined constant (X) must be given an appropriate value.

Optionally, the target end point is indicated on the display, and more preferably wherein the target end point is indicated on the display by a further display component.

Optionally, when the sum of the representative values is greater than the pre-defined constant (X) the substantially contiguously arranged display components extend beyond the target end point, and optionally when the sum of the representative values is less than the pre-defined constant (X) the substantially contiguously arranged display components do not reach the target end point. Optionally, such contiguous display may be represented in what is conventionally referred to as a "doughnut chart".

Optionally, the display components may comprise correspondingly shaped elements shown by the display. Each display component optionally comprises a shape shown on the display for which the dimension that is proportional to the value that is representative of the corresponding image variable extends between a first end to a second end of the display component, and wherein the display components are arranged such that the first end of a display element corresponding to one of the image variables is adjacent to the second end of an immediately preceding display component.

Optionally, each of display components comprises a circular arc shown on the display, and wherein the length of the arc is proportional to the value that is representative of each image variable. Then when the sum of the representative values is equal to a pre-defined constant (X) the substantially contiguously arranged display components may extend around a circumference of a circle.

Alternatively, each of display components may comprise any of: a line and parallelogram shown on the display, and wherein the length of the line or parallelogram is proportional to the value that is representative of each image variable. Then when the sum of the representative values is equal to a pre-defined constant (X) the substantially contiguously arranged display components may extend from a start point to a target end point that is indicated on the display.

Optionally, the method may further comprise the following steps:
receiving an input that changes a value that is representative of one of the variables;
consequentially adjusting one or more other values that are representative of one or more other variables so that the sum of the values is equal to the pre-defined constant (X); and
for each of the values that have been adjusted, adjusting the display component that corresponds to the adjusted image variables.

Optionally, for any of the values that have been adjusted that are representative of an image variable that is associated with an attribute of the image capture device, adjusting both the display component and attribute of the image capture device that corresponds to the adjusted value.

Optionally, the step of receiving an input that changes one of the values that is representative of one of the variables may comprise receiving a user input that changes one of the values that is representative of one of the variables, consequentially adjusting both the corresponding display component and a corresponding attribute of an image capture device.

Optionally, the variables may comprise factors that impact on an image luminance/brightness of an image to be captured. These factors may comprise attributes of an image capture device and conditions that affect scene brightness/luminance of the scene.

Optionally, variables may comprise aperture size ($D_r$), shutter speed ($T_r$), and sensitivity ($S_r$) of an image sensor of the image capture device, and scene luminance ($L_r$) for the scene. Optionally, the variables may further comprise flash intensity (F) and transmittance/optical density of any neutral density filters (ND).

Optionally, the pre-defined constant (X) may correspond to a sum of the representative values that results in a captured image having an average luminance equivalent to between 10% and 20% reflectance in visible light, and preferably between 12.5% and 18% reflectance in visible light.

Optionally, the values that are representative of each of the variables may each positively correlate with the corresponding variable. Optionally, the values that are representative of each of the variables may positively correlate with the image luminance of the captured image.

Optionally, the method may further comprise receiving a user input that initiates the capturing of an image using one or more current image variables as changed by the receiving of the input.

Optionally, the step of determining values that are representative of each of a plurality of variables may comprise obtaining initial values from each of one or more inputs of an image capture device, wherein the inputs are obtained from one or more of user controls of the image capture device, external device connections, and sensors of the image capture device.

Optionally, the step of representing each of the image variables on a display using a display component may comprise any of:
for each of the variables, generating a corresponding display component on an electronic visual display of an image capture device; or
for each of the variables, providing a corresponding display component of a mechanical display.

According to a second aspect there is provided a method of operating an image capture device to capture an image of a scene, the method comprising the steps of:
determining values that are representative of each of a plurality of image variables;
representing each of the image variables on a display using a display component, wherein a dimension of each display component is proportional to the value of the corresponding image variable, and wherein the display components representing each of the image variables are arranged substantially contiguously such that when the sum of the values is equal to a pre-defined constant (X) the substantially contiguously arranged display components extend between an origin point on the display and a target end point on the display;
receiving an input that changes one of the values that is representative of one of the image variables, consequentially adjusting one or more other values that are representative of other image variables so that the sum of the image variables is equal to the pre-defined constant (X) and, for each of the values that have been adjusted, adjusting the display component that corresponds to the adjusted image variables;
capturing of an image using the current image variables.

According to a third aspect there is provided a computer readable medium storing computer interpretable instructions which when interpreted by a programmable computer cause the computer to perform a method in accordance with any other aspect.

According to a fourth aspect there is provided a computer-implemented method of operating an image capture device, the method comprising the steps of:
using a processor to determine values that are representative of each of a plurality of image variables;
using a processor to represent each of the image variables on a display using a display component, a dimension of each display component being correlated with the value of the corresponding image variable, and the display components representing each of the image variables being arranged substantially contiguously such that when the sum of the image variables is equal to a pre-defined constant (X) the substantially contiguously arranged display components extend between an origin point on the display and a target end point on the display;

upon receiving an input that changes one of the values that is representative of one of the image variables, using a processor to consequentially adjust the corresponding display component; and using an image sensor of the image capture device to capture an image using the current image variables.

According to a fifth aspect there is provided a computer-implemented method of operating an image capture device, the method comprising the steps of:

using a processor to determine values that are representative of each of a plurality of image variables;

using a processor to represent each of the image variables on a display using a display component, a dimension of each display component being correlated with the value of the corresponding image variable, and the display components representing each of the image variables being arranged substantially contiguously such that when the sum of the image variables is equal to a pre-defined constant (X) the substantially contiguously arranged display components extend between an origin point on the display and a target end point on the display;

upon receiving an input that changes one of the values that is representative of one of the image variables, using a processor to consequentially adjust one or more other values that are representative of other image variables so that the sum of the image variables is equal to the pre-defined constant (X) and, for each of the values that have been adjusted, to adjust the display component that corresponds to the adjusted image variables; and using an image sensor of the image capture device to capture an image using the current image variables.

References to "display components" may be taken to refer to one or more arcs of the circle arrangement disclosed herein. In some embodiments, these arcs will also function as input control components that a user can touch on a touch screen.

According to a sixth aspect there is provided an image capture device that is arranged to capture an image of a scene. The image capture device comprises an image sensor, a plurality of inputs, a display, and a processor. The processor is configured to:

determine values that are representative of each of a plurality of image variables;

represent each of the image variables on the display using a display component, a dimension of each display component being proportional to the value of the corresponding image variable, and the display components representing each of the image variables being arranged substantially contiguously such that when the sum of the image variables is equal to a pre-defined constant (X) the substantially contiguously arranged display components extend between an origin point on the display and a target end point on the display;

receive an input that changes one of the values that is representative of one of the image variables and consequentially adjust the corresponding display component; and cause the image sensor to capture an image using the current image variables.

According to a seventh aspect there is provided an image capture device that is arranged to capture an image of a scene. The image capture device comprises an image sensor, a plurality of inputs, a display, and a processor. The processor is configured to:

determine values that are representative of each of a plurality of image variables;

represent each of the image variables on the display using a display component, a dimension of each display component being correlated with the value of the corresponding image variable, and the display components representing each of the image variables being arranged substantially contiguously such that when the sum of the image variables is equal to a pre-defined constant (X) the substantially contiguously arranged display components extend between an origin point on the display and a target end point on the display;

receive an input that changes one of the values that is representative of one of the image variables, consequentially adjust one or more other values that are representative of other image variables so that the sum of the image variables is equal to the pre-defined constant (X) and, for each of the values that have been adjusted, to adjust the display component that corresponds to the adjusted image variables; and cause the image sensor to capture an image using the current image variables.

Optionally, the image sensor of the image capture device may comprise any of an electronic image sensor (e.g. a charge-coupled device (CCD) image sensor or an active-pixel sensor (APS)/CMOS image sensor) and a light-sensitive material (e.g. photographic film).

Optionally, the inputs may comprise user controls of the image capture device. Optionally, the user controls of the image capture device may comprise one or more of a touch screen, a touch pad, a voice-user interface, a gesture recognition device, a motion sensing device and manually operated user input devices (e.g. buttons, knobs, wheels, sliders, and switches). Optionally, the inputs may further comprise one or more of external device connections, and sensors of the image capture device.

Optionally, the display may comprise any of an electronic visual display and a mechanical display.

Optionally, the image capture device may be any of a photographic camera, a smart phone, a microscope, a video camera, a virtual camera within a virtual embodiment, a wearable camera, and/or a multi aperture computational camera.

Optionally, the image capture device may comprise a camera device providing the image sensor and a peripheral control device providing the display and one or more of the plurality of inputs, the peripheral control device and the camera device being configured to communicate with one another. Optionally, the processor may then be provided by any of the camera device and the peripheral control device.

According to an eighth aspect there is provided a user control device. The user control device comprises an interface configured to communicate with the device, a plurality of inputs, a display, and a processor. The processor is configured to:

determine values that are representative of each of a plurality of variables;

represent each of the variables on the display using a display component, a dimension of each display component being proportional to the value of the corresponding variable, and the display components representing each of the variables being arranged substantially contiguously such that when the sum of the variables is equal to a pre-defined constant (X) the substantially contiguously arranged display components extend between an origin point on the display and a target end point on the display;

receive an input that changes one of the values that is representative of one of the variables and consequentially adjust the corresponding display component.

Optionally, the device is an image capture device operable to capture an image of a scene. Optionally, one or more of the plurality of variables comprise image variables, for the reasons as disclosed herein. Optionally, the user control device further comprises an image capture device.

According to a ninth aspect there is provided a user control device (or user controllable device) for controlling an image capture device. The user control device comprises an interface configured to communicate with the image capture device, a plurality of inputs, a display, and a processor. The processor is configured to:

determine values that are representative of each of a plurality of image variables;

represent each of the image variables on the display using a display component, a dimension of each display component being correlated with the value of the corresponding image variable, and the display components representing each of the image variables being arranged substantially contiguously such that when the sum of the image variables is equal to a pre-defined constant (X) the substantially contiguously arranged display components extend between an origin point on the display and a target end point on the display;

receive an input that changes one of the values that is representative of one of the image variables, consequentially adjust one or more other values that are representative of other image variables so that the sum of the image variables is equal to the pre-defined constant (X) and, for each of the values that have been adjusted, to adjust the display component that corresponds to the adjusted image variables; and cause the image capture device to capture an image using the current image variables.

Optionally, the interface may comprise any of a wireless transceiver and a hardware interface connection.

Optionally, the plurality of inputs may comprise user controls of the user control device. Optionally, the user controls of the user control device may comprise one or more of a touch screen, a touch pad, a voice-user interface, a gesture recognition device, a motion sensing device and manually operated user input devices (e.g. buttons, knobs, wheels, sliders, and switches). Optionally, the inputs may further comprise one or more of sensors of the image capture device the outputs of which are communicated to the user control device over the interface.

According to another aspect, there is provided a method for controlling a device having one or more variables, comprising the steps of: representing one or more variables as one or more segments in a doughnut chart; wherein each segment has a start and an end point along a circumference of the doughnut chart; displaying the doughnut chart; receiving user inputs to adjust the start point and/or the end point of at least one of the one or more segments; adjusting the one or more variables in accordance with the adjusted start and/or end point of each of the one or more segments; wherein each of the one or more segments can be adjusted to overlap a neighbouring of the one or more segments.

By providing a doughnut chart, a suggested total value for the sum of the variables can be represented over 360 degrees, such that segments of the doughnut chart can overlap neighbouring segments where the total sum of the variables exceeds this suggested total value. Where the sum of the variables is lower than this suggested total value, the doughnut chart can be shown with a gap between at least two of the segments. A user can adjust each "end" of each segment to reduce or increase its size along the circumference of the doughnut chart, causing the segments to overlap, open up a gap between two segments, or such that the edges of neighbouring segments meet to reach the suggested total value. By adjusting the segment sizes, the underlying variables of the device represented by the respective segment can be altered, thus providing a control method for a device that provides feedback using the doughnut chart.

BRIEF DESCRIPTION OF THE DRAWINGS

Embodiments will now be more particularly described by way of example only with reference to the accompanying drawings, in which:

FIGS. 7a to 7d illustrate example embodiments in which each of display components a parallelogram;

FIG. 14 is a table of exemplary values.

DETAILED DESCRIPTION

In order to at least mitigate the problems identified above there will now be described a method of operating devices such as an image capture device to capture an image of a scene. Specifically, the embodiment described relates to an image capture device, wherein the scene comprises objects that are within a field of view of the image capture device. The method of operating devices, with minor implementation changes, is applicable to other types of devices and some further example devices are described further below.

Figure 1:
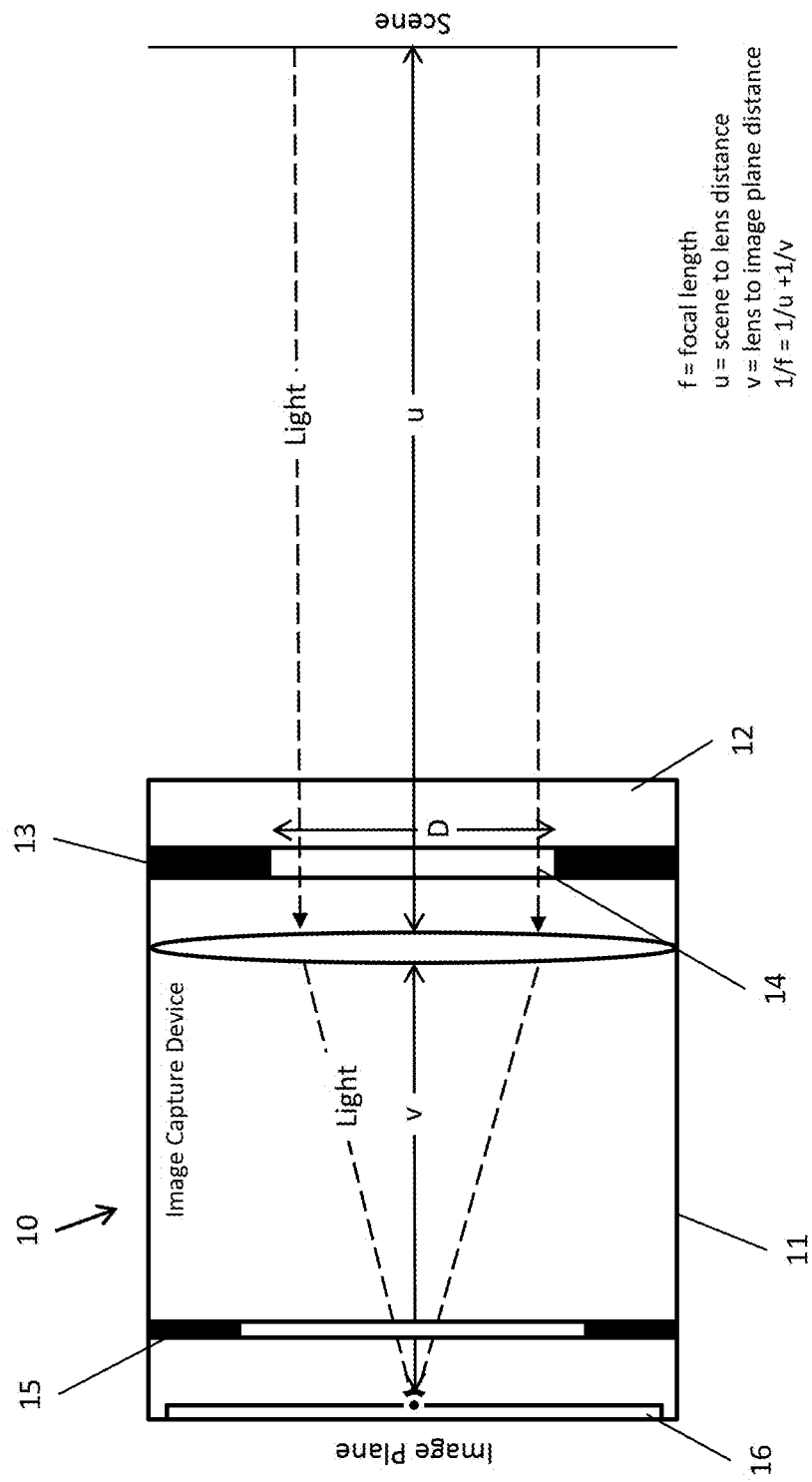
FIG. 1 illustrates schematically a conventional image capture device.
Figure 2:
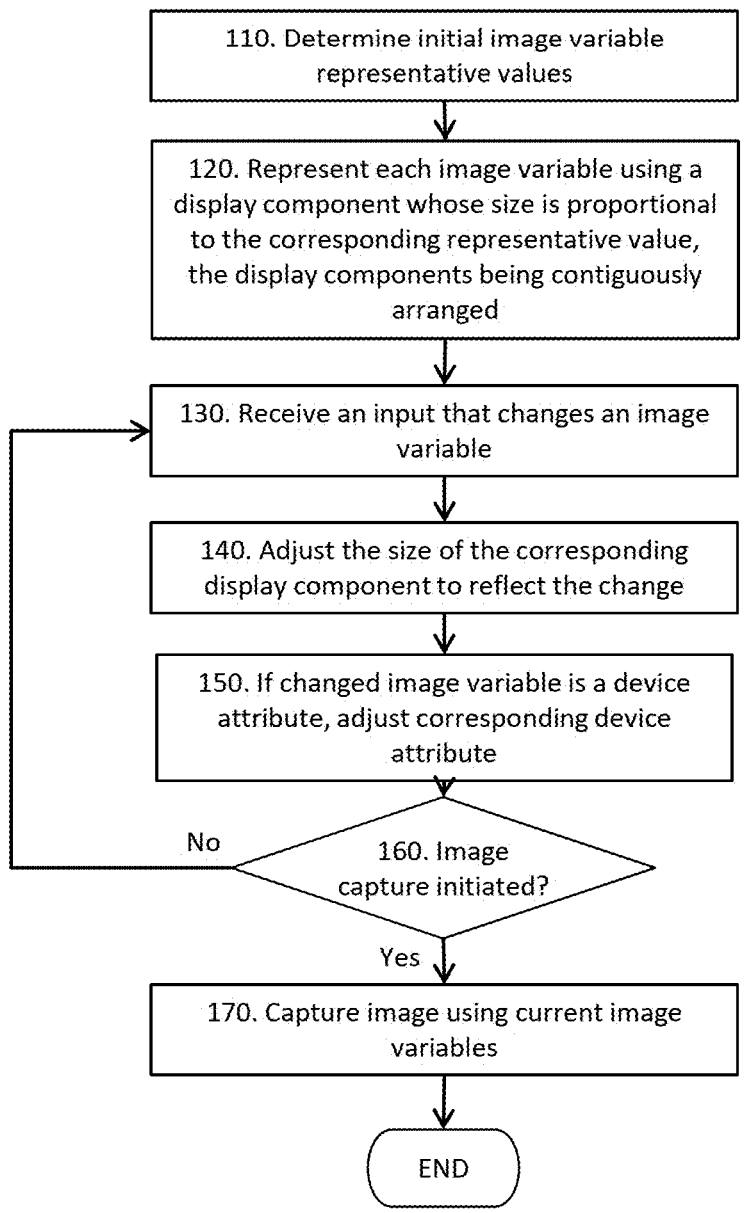
FIG. 2 is a flow diagram illustrating the method of operating an image capture device as described herein.

FIG. 2 is a flow diagram illustrating the method of operating an image capture device according to an embodiment. The method involves determining values that are representative of each of a plurality of image variables (110), and representing each of the image variables on a display using a display component, a dimension of each display component being proportional to the value that is representative of the corresponding image variable and the display components representing each of the image variables being arranged substantially contiguously (120). The arrangement of the display components is such that when the sum of the representative values corresponding to each of the image variables is equal to a pre-defined constant (X) then the display components extend between an origin point on the display and a target end point on the display.

Then, upon receiving an input that changes one of the values that is representative of one of the image variables (130), the dimension of the corresponding display component that is proportional to the value is consequentially adjusted (140) to reflect the change. This process of adjusting the display components in response to a change in the representative value of a corresponding image variable can be repeated up until the point at which image capture is initiated. Then, when image capture is subsequently initiated (160), an image is then captured using the current image variables (170).

In this embodiment, the value of the pre-defined constant (X) corresponds to a target image luminance/brightness. By way of example, in some embodiments the pre-defined constant (X) could be configured to correspond to a target image luminance that is equivalent to between 10% and 20% reflectance of visible light, and preferably between 12.5% and 18% reflectance of visible light. Consequently, when the substantially contiguously arranged display components extend between an origin point on the display and a target end point on the display, this illustrates that the current image variables will result in a captured image having the target image luminance/brightness. It can be arranged such that the values that are representative of each of the image variables positively correlate with the image luminance of the captured image (i.e. that an increase in the representative value corresponds to an increase in the image luminance, and a decrease in the representative value corresponds to a decrease in the image luminance).

Consequently, the image variables can include any factors that impact on the image luminance/brightness of the image to be captured and will therefore comprise the attributes of the image capture device and any conditions that affect the scene luminance/brightness. Typically, the image variables will therefore comprise at least the aperture size (D), shutter speed (T), and sensitivity (S) of an image sensor of the image capture device, and scene luminance ($L_v$) for the scene.

In this regard, the aperture size (D), shutter speed (T), and sensitivity (S) are all attributes of the image capture device such that an input that changes any one of these image variables could be a user input made using user controls of the image capture device. These user controls can be provided on the image capture device itself, or may be provided on an external device that is in communication with the image capture device. For example, the user controls could be provided on a separate computer device (e.g. smart phone, tablet computer, smart watch etc.) that communicates with the image capture device using either a wired or wireless connection.

In contrast, scene luminance ($L_v$) is a condition of the environment surrounding the scene that cannot directly be changed using the controls of the image capture device. Consequently, the scene luminance ($L_v$) will be determined from measurements made by a light sensor. This sensor can be provided as part of the image capture device; however, it may also be provided by an external light meter that communicates with the image capture device using either a wired or wireless connection. It is appreciated that scene luminance can conventionally be indirectly controlled by, for example, a flash on a camera or smartphone camera and/or by lamps on a microscope.

The image variables may also further comprise the user controlled lighting, such as flash intensity (F) of any applied flash and/or the transmittance/optical density of any neutral-density filter (ND). Flash can be provided by either an internal flash unit provided as part of an image capture device or by an external flash unit. Flash intensity (F) could therefore be considered to be one or both of an attribute of the image capture device and a condition that affects the scene luminance. Similarly, neutral-density filters can be provided as either an integral part of an image capture device or by a separate accessory that is attached to the image capture device. The transmittance/optical density of any neutral-density filter could therefore be considered to be one or both of an attribute of the image capture device and a condition that affects the scene luminance.

Therefore, as shown in FIG. 2, if an input changes a representative value that is representative of an image variable that is associated with an attribute of the image capture device, then the attribute of the image capture device that corresponds to the adjusted value is also consequentially adjusted (150) so as to reflect the change in the image variable.

Figure 3:
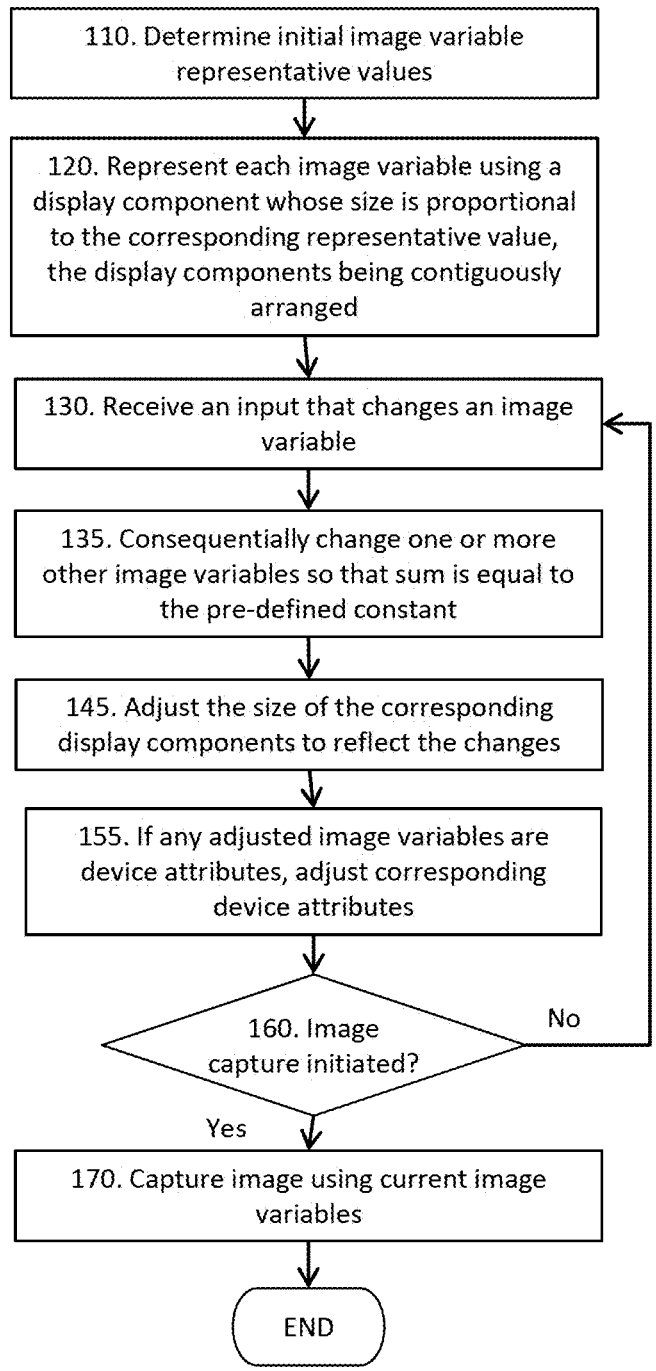
FIG. 3 is a flow diagram illustrating a preferred embodiment of the method of operating an image capture device as described herein that further comprises steps that implement a semi-automated mode of image capture.

FIG. 3 is a flow diagram illustrating an embodiment of the method of operating an image capture device as described above that further comprises steps that implement a semi-automated mode of image capture. In this embodiment, the method further comprises, after receiving an input that changes a value that is representative of one of the image variables (130), consequentially adjusting one or more other values that are representative of other image variables so that the sum of the values is equal to the pre-defined constant (X) (135). Then, for each of the values that have been adjusted, the dimension of the corresponding display component that is proportional to the value is consequentially adjusted (145) to reflect the change.

For each of the one or more other values that are consequentially adjusted and that are representative of an image variable associated with an attribute of the image capture device, then the attribute of the image capture device that corresponds to the adjusted value is also consequentially adjusted (155) so as to reflect the change in the image variable. Then, when image capture is subsequently initiated (160), an image is then captured using the current image variables (170).

As described above, the display components are arranged such that when the sum of the representative values corresponding to each of the image variables is equal to a pre-defined constant (X), then the display components extend between an origin point on the display and a target end point on the display. Consequently, when the sum of the representative values is greater than the pre-defined constant (X) the substantially contiguously arranged display components will extend beyond the target end point, and when the sum of the representative values is less than the pre-defined constant (X) the substantially contiguously arranged display components do not reach the target end point.

In some embodiments, the display components comprise correspondingly shaped elements shown by the display. In some embodiments, each display component comprises a shape shown on the display for which the dimension that is proportional to the value that is representative of the corresponding image variable extends between a first end to a second end of the display component. The substantially contiguous arrangement of the display components then requires that the first end of a display element corresponding to one of the image variables is adjacent to the second end of an immediately preceding display component.

Figure 4:
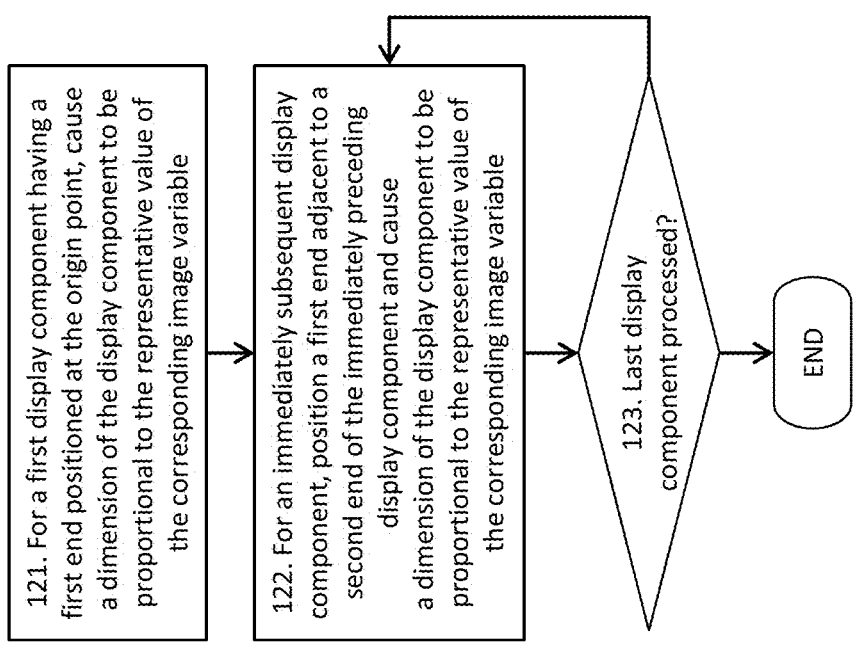
FIG. 4 is a flow diagram illustrating an embodiment of the step of representing each of the image variables on a display using a display component.

FIG. 4 is a flow diagram illustrating an embodiment of the step of representing each of the image variables on a display using a display component (120). In this embodiment, this step of the method further comprises, for a first display component, positioning a first end of the display component at the origin point and causing a dimension of the display component to be proportional to the representative value of the corresponding image variable (121). Then, for an immediately subsequent display component, positioning a first end of the subsequent display component adjacent to a second end of the first display component and causing a dimension of the subsequent display component to be proportional to the representative value of the corresponding image variable (122). This process is then repeated for all of the display components that represent the applicable image variables (123). Consequently, for the next immediately subsequent display component, a first end of the subsequent display component is positioned adjacent to a second end of the immediately preceding display component and a dimension of the subsequent display component is made to be proportional to the representative value of the corresponding image variable (122).

Figure 5:
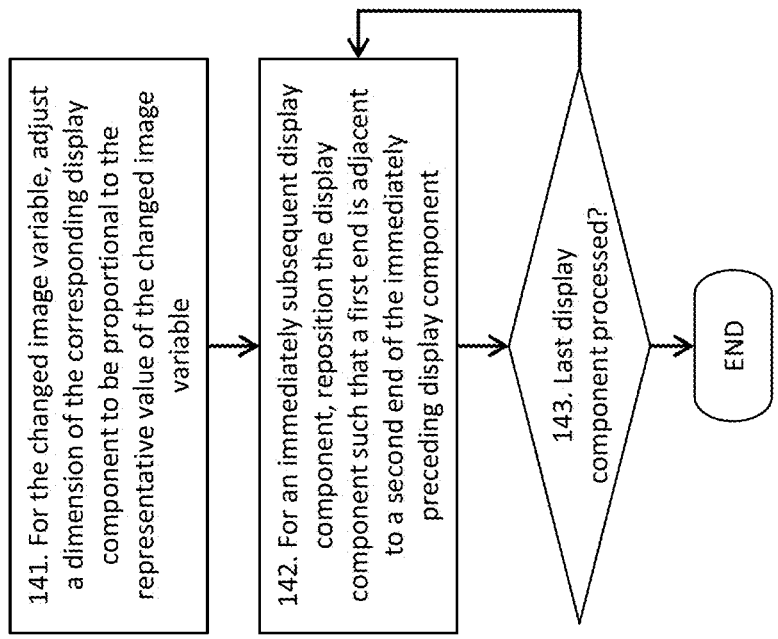
FIG. 5 is a flow diagram illustrating an embodiment of the step of consequentially adjusting the dimension of a display component to reflect a change in the corresponding representative value.

FIG. 5 is a flow diagram illustrating an embodiment of the step of consequentially adjusting the dimension of a display component to reflect a change in the corresponding representative value (140, 145). In this embodiment, this step of the method further comprises, for the changed image variable, adjusting a dimension of the corresponding display component to be proportional to the representative value of the changed image variable (141). Then, for an immediately subsequent display component, repositioning the subsequent display component such that a first end is adjacent to a second end of the immediately preceding display component (142). This process is then repeated for all of the subsequent display components (i.e. for all of the those display components that subsequent to the display component corresponding to the changed image variable) (143).

Figure 6A:
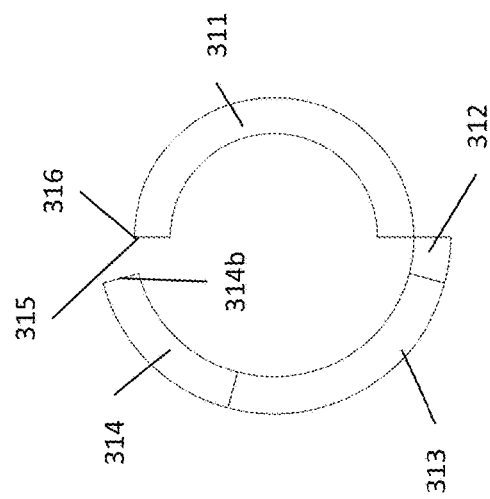
FIGS. 6a to 6j illustrate example embodiments in which each of the display components comprises a circular arc.
Figure 6B:
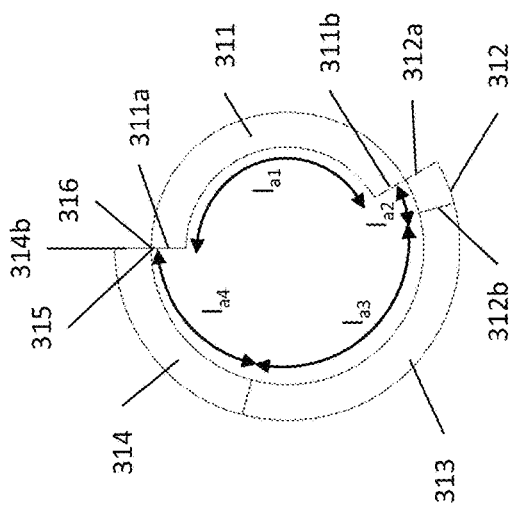
Figure 6D:
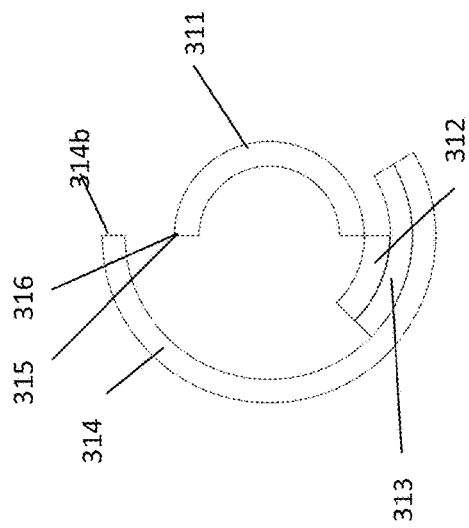

In some embodiments, each of the display components comprises a circular arc shown on the display, and the length of the arc is then proportional to the value that is representative of each image variable. In such an embodiment, when the sum of the representative values is equal to the pre-defined constant (X) then the substantially contiguously arranged display components can extend around a circumference of a circle and at least partially complete the approximate formation of the circle. For example, FIGS. 6a to 6j illustrate example embodiments in which each of the display components (311, 312, 313, 314) comprises a circular arc wherein the length ($I_a$) of each arc is proportional to the value that is representative of the corresponding image variable. FIGS. 6a, 6e and 6g illustrate examples in which the sum of the representative values is equal to the pre-defined constant (X) such that the substantially contiguously arranged display components extend from an origin point (315) to a target end point (316) such that they form a circle. In contrast, FIGS. 6b, 6c, 6d, 6f, 6h, 6i, and 6j then illustrate examples in which the sum of the representative values is less or more than the pre-defined constant (X) such that the substantially contiguously arranged display components extend around a circumference of a circle but do not reach the target end point (316) or extend beyond the target end point. One or more of the representative values may be a negative value, and hence a negative display component may be shown.

As described above, in FIGS. 6a to 6j the display components (311, 312, 313, 314) contiguously arranged such that extend around the circumference of a circle. To do so, a first end (311a) of a first display component (311) is positioned at the origin point (315). The dimension of the first display component (311) (i.e. the arc length, $I_{a1}$) is then configured to be proportional to the representative value of the corresponding image variable. A first end (312a) of the second display component (312) is then positioned adjacent to a second end (311b) of the first display component (311). The dimension of each display component that is proportional to the representative value is that dimension which extends between the first end of the display component and the second end of the display component. The dimension of the second display component (312) (i.e. the arc length, $I_{a2}$) is then configured to be proportional to the representative value of the corresponding image variable. This arrangement then continues for each of the third and fourth display components (313, 314).

Figure 6C:
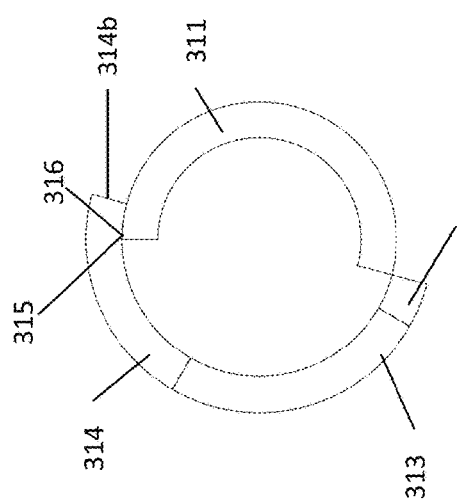
Figure 6E:
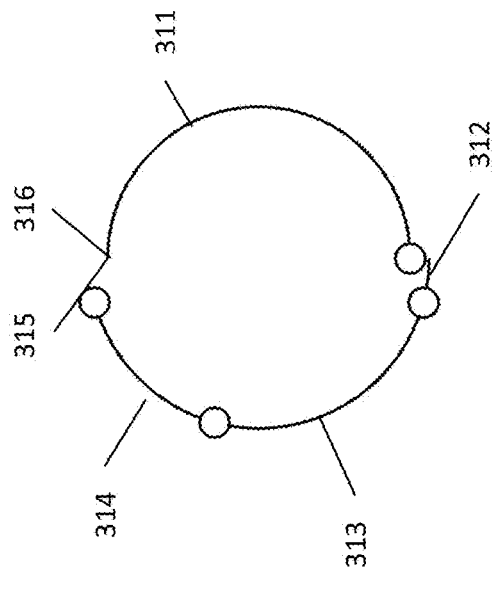
Figure 6F:
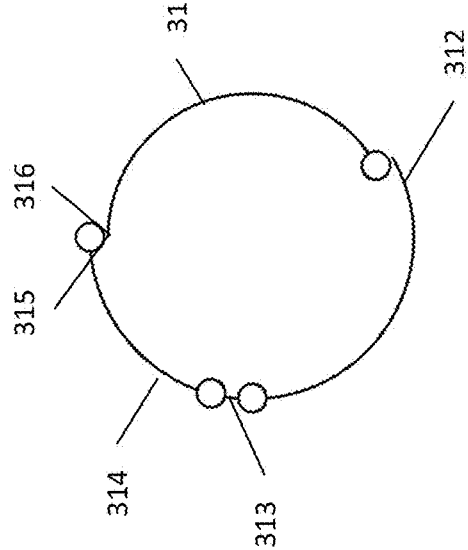
Figure 6G:
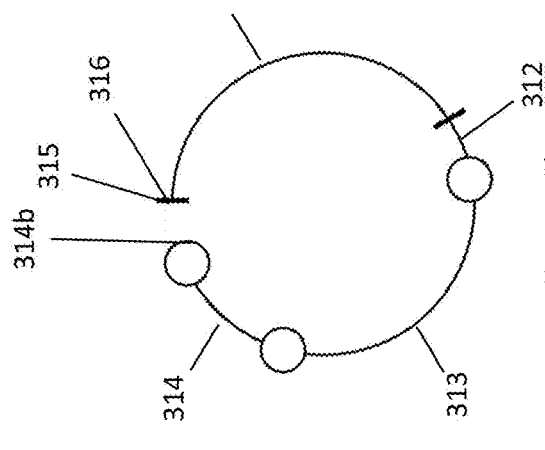
Figure 6H:
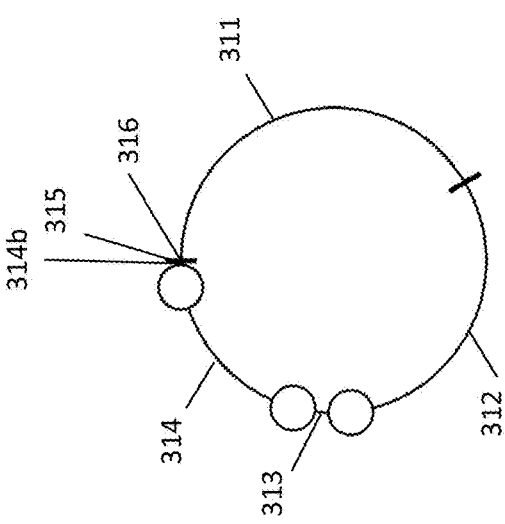
Figure 6J:
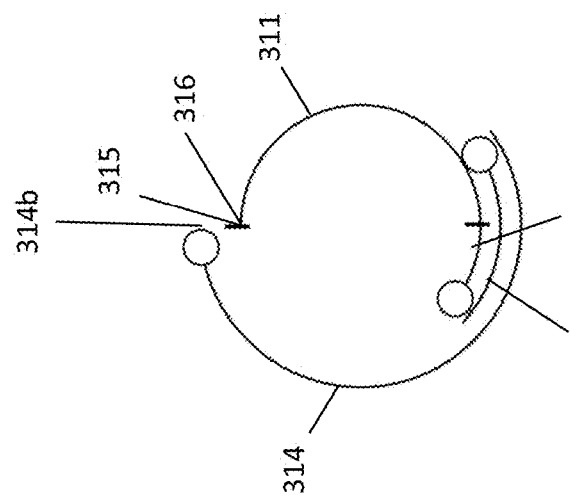
Figure 6I:
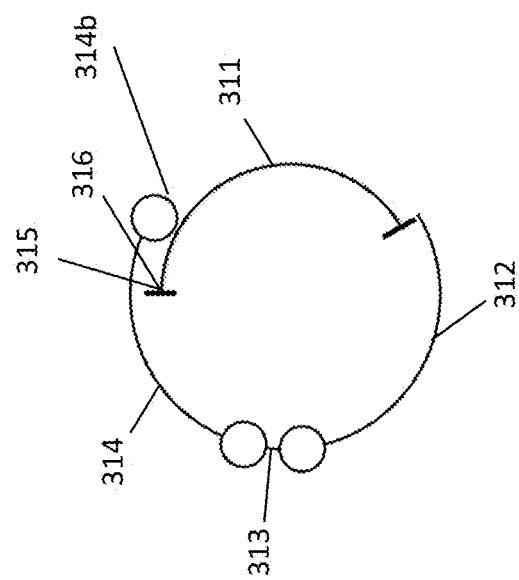

In the examples of FIGS. 6a and 6c, in which the sum of the representative values is equal to the pre-defined constant (X), the second end (314b) of the fourth and final display component (314) reaches/is located at the target end point (316) such that the display components form a circle. In the examples of FIGS. 6b and 6d, in which the sum of the representative values is less than the pre-defined constant (X), the second end (314b) of the fourth and final display component (314) does not reach the target end point (316). The contiguously arranged display components therefore extend around a portion of the circumference of a circle.

In the examples illustrated in FIGS. 6a to 6j the value that is representative of the scene luminance ($L_v$) is displayed using a circular arc (311) that is effectively offset from those arcs that display the other image variables. This offsetting is achieved by reducing the radius of arc (311) relative to the other arcs. However, this offsetting could equally be achieved by increasing the radius of arc (311) relative to the other arcs. In either case, the arcs are still arranged such that the second end (311b) of the arc (311) representing the scene luminance is adjacent to the first end (312a) of the next arc (312) such that the path defined by the contiguously arranged display elements is clearly a circle. This offsetting of the arc (311) that displays the scene luminance representative value may be present at all times, or it may only occur in the event (as for example in FIG. 6c) wherein the image components sum to a value greater than the target X. This offsetting of the arc (311) that displays the scene luminance representative value may in some embodiments additionally illustrate to a user of the image capture device that this is an image variable that is not an attribute of the image capture device and is therefore not in the direct control of the user.

In addition, it is also possible for other arcs to be offset relative to one another. For example, this may be desirable in situations in which the sum of the variables is greater than the pre-defined constant (X), such that the substantially contiguously arranged display components extend beyond the target end point. In this case, offsetting of the arcs allows the arcs to extend beyond the target end point without overlapping on top of one another, and thereby clearly illustrates to the user the extent to which the sum of the variables is greater than the pre-defined constant (X) (e.g. that corresponds to the target image luminance/brightness).

In a further exemplary embodiment, each of display components comprises any of a line and parallelogram shown on the display, and the length of the line or parallelogram is then proportional to the value that is representative of each image variable. For example, FIGS. 7a to 7d illustrate example embodiments in which each of display components (411, 412, 413, 414) comprises a rectangle wherein the length of the rectangle is proportional to the value that is representative of the corresponding image variable. FIGS. 7a to 7d illustrate examples in which the sum of the representative values is equal to the pre-defined constant (X) such that the substantially contiguously arranged display components (411, 412, 413, 414) extend from an origin point (415) to a target end point (416) along a pre-defined, linear path.

In some embodiments the target end point is explicitly indicated on the display. In particular, the target end point would be explicitly indicated on the display by a further display component. For example, in FIG. 7d the target end point (416) is explicitly indicated by a further display component (417) comprising a triangle located adjacent to the target end point.

As described above, in FIGS. 7a to 7d the display components (411, 412, 413, 414) extend from an origin point (415) to a target end point (416) along a pre-defined, linear path. To do so, a first end (411a) of a first display component (411) is positioned at the origin point (415). The dimension of the first display component (411) (i.e. the length, $I_{L1}$) is then configured to be proportional to the representative value of the corresponding image variable. A first end (412a) of the second display component (412) is then positioned adjacent to a second end (411b) of the first display component (411). The dimension of each display component that is proportional to the representative value is that dimension which extends between the first end of the display component and the second end of the display component. The dimension of the second display component (412) (i.e. the length, $I_{L2}$) is then configured to be proportional to the representative value of the corresponding image variable. This arrangement then continues for each of the third and fourth display components (413, 414).

Figure 8:
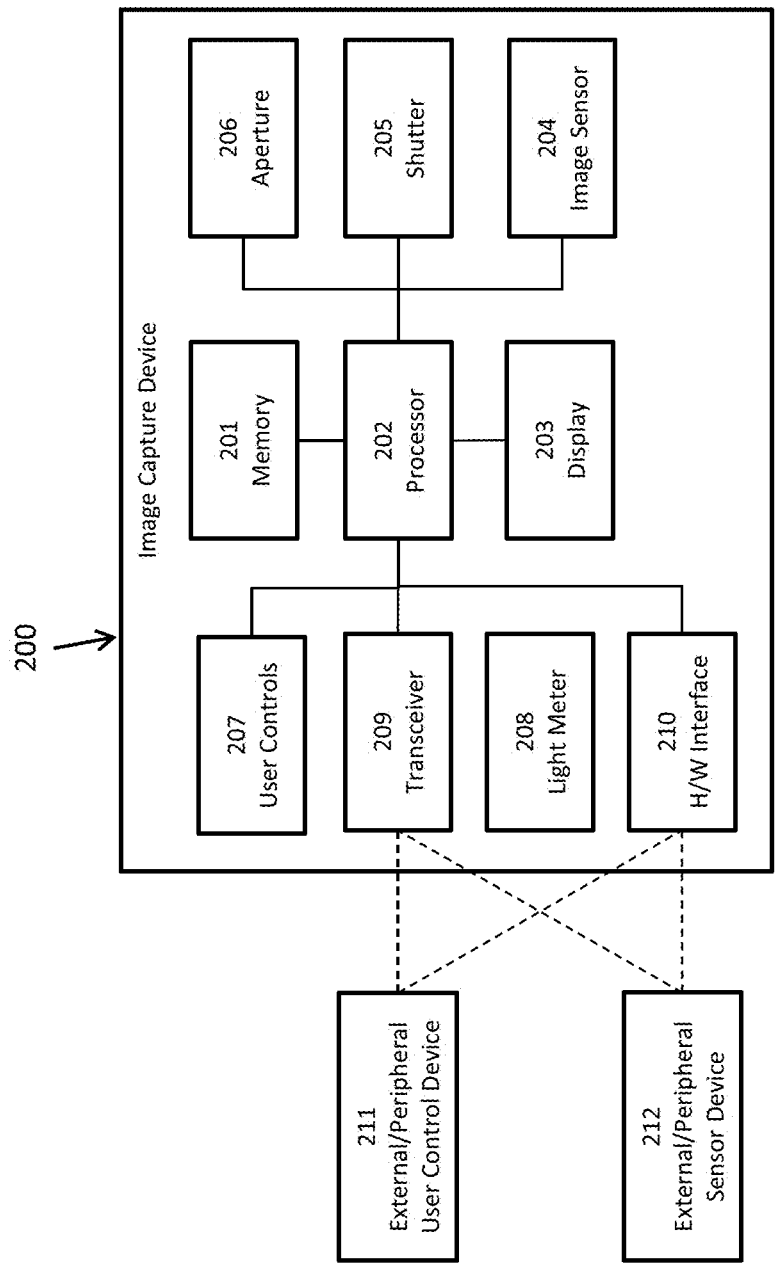
FIG. 8 illustrates schematically an embodiment of an image capture device suitable for implementing the methods described herein.

FIG. 8 illustrates schematically an embodiment of an image capture device (200) suitable for implementing the methods described herein. The image capture device (200) is typically implemented as a combination of hardware components and software, and comprises a memory (201), a processor (202), a display (203), an image sensor (204), a shutter mechanism (205), an aperture mechanism (206), and a plurality of user controls (207). Optionally, the image capture device (200) may further comprise a light meter (208) and/or a wireless transceiver (209) and/or a hardware interface connection (210). In addition, the image capture device (200) could also be provided with means for providing audio and/or haptic feedback to the user.

The memory (201) typically stores the various programs/executable files that are implemented by the processor (202), as well as any other data that may be of use to the device (200). In particular, the memory (201) will store the value of the pre-defined constant (X).

The processor (202) is configured to implement the processing necessary to perform the methods described above in accordance with computer interpretable instructions that are stored in the memory (201) in the form of one of programs/executable files. In particular, the processor (202) is configured to perform the steps of:

i. determining values that are representative of each of a plurality of image variables, ii. representing each of the image variables on the display using a display component, a dimension of each display component being proportional to the value of the corresponding image variable, and the display components representing each of the image variables being arranged substantially contiguously such that when the sum of the image variables is equal to a pre-defined constant (X) the substantially contiguously arranged display components extend between an origin point on the display and a target end point on the display, iii. upon receiving an input that changes one of the values that is representative of one of the image variables, consequentially adjusting the corresponding display component; and iv. causing the image sensor to capture an image using the current image variables.

In addition, the processor (202) may be configured to implement a semi-automated mode of image capture as described above. In particular, the processor (202) would then be further configured to perform the steps of:

iii. after receiving an input that changes a value that is representative of one of the image variables, consequentially adjusting one or more other values that are representative of other image variables so that the sum of the values is equal to the pre-defined constant (X); and iv. for each of the values that have been adjusted, consequentially adjusting the dimension of the corresponding display component that is proportional to the value to reflect the change; and v. causing the image sensor to capture an image using the current image variables.

The display (203) is configured to display the substantially contiguously arranged display components and could comprise any of an electronic visual display and a mechanical display.

Figure 9:
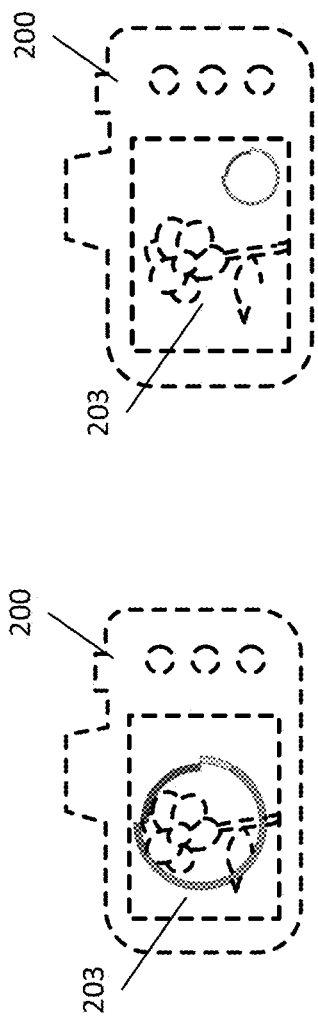
FIG. 9 illustrates schematically an embodiment in which the display comprises an electronic visual display and touch control that is provided as an integral component of a digital camera.
Figure 10:
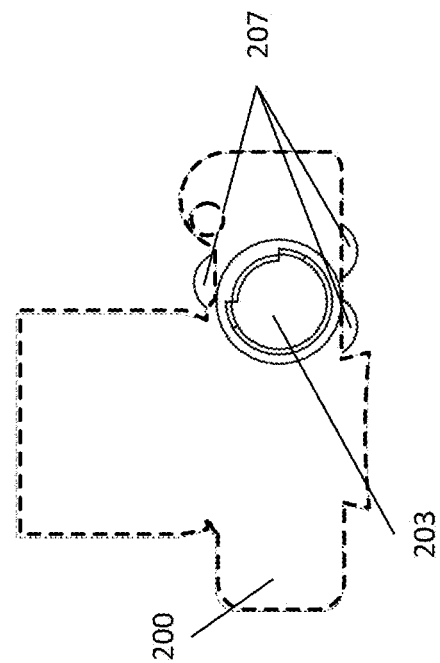
FIG. 10 illustrates schematically a further embodiment in which the display comprises an electronic visual display that is provided as an integral component of a digital camera.

By way of example, FIGS. 9 and 10 illustrate schematically embodiments in which the display comprises an electronic visual display that is provided as an integral component of a digital camera. In particular, in the embodiment of FIG. 9 the display is provided by a screen provided in the rear surface of a digital camera. In the embodiment of FIG. 10 the display is provided by a separate electronic visual display located on an upper surface of a digital camera, adjacent to control wheels that provide user controls for each of the aperture size (D), shutter speed (T), and sensitivity (S). In addition, or as an alternative to the embodiments shown in FIGS. 9 and 10, the display could be provided by a viewfinder of an image capture device.

Figure 11:
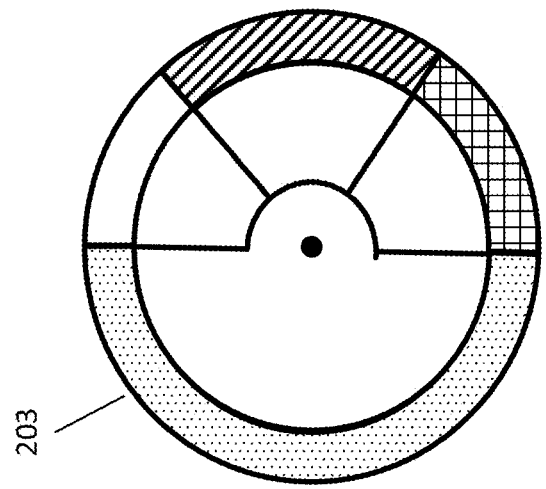
FIG. 11 illustrates schematically an embodiment in which the display comprises a mechanical display.
Figure 13:
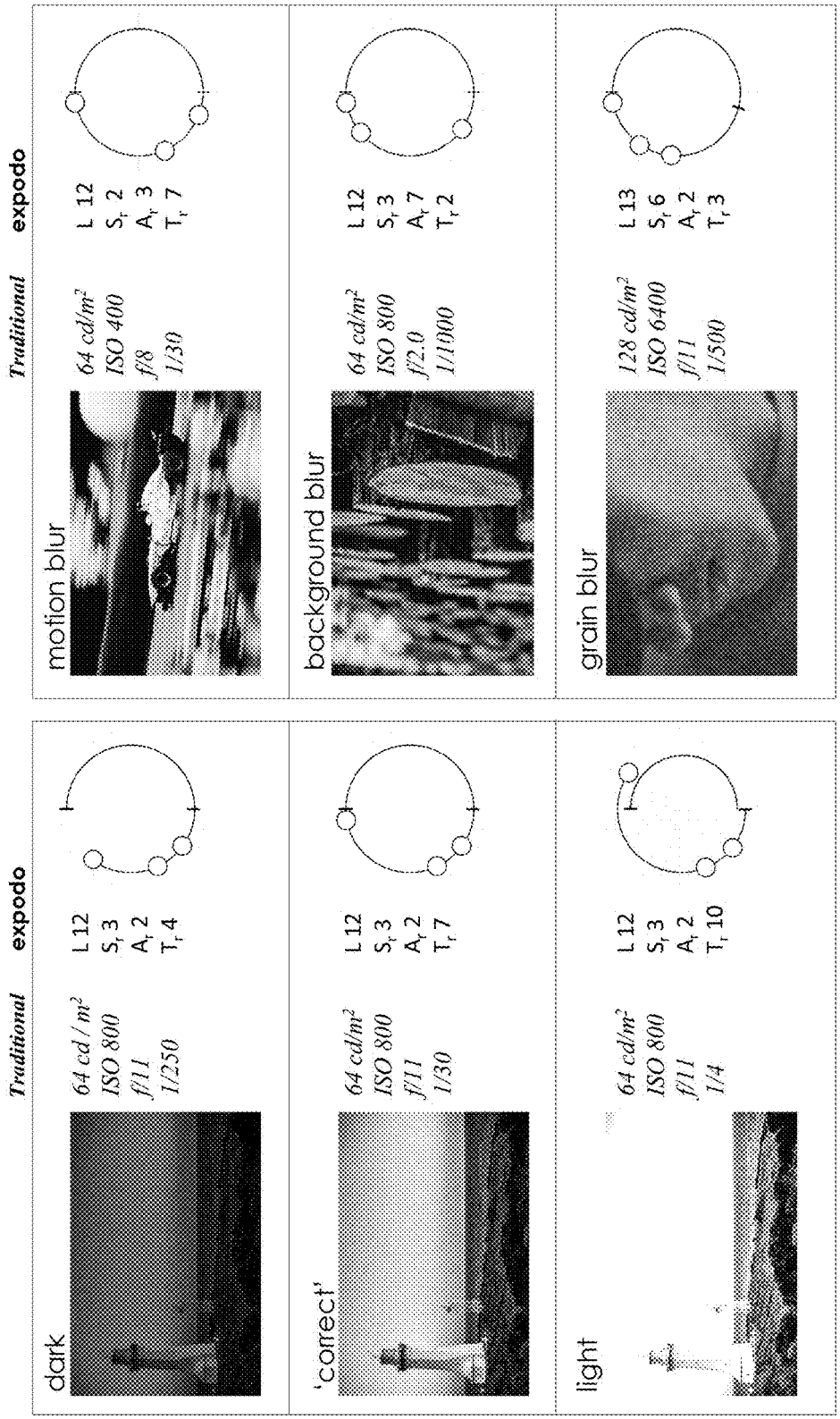
FIG. 13 illustrates a set of images using a range of different variable values

As an alternative example, FIG. 11 illustrates schematically an embodiment in which the display comprises a mechanical display. In particular, in the embodiment of FIG. 11 the display is provided in the form of a wheel chart or volvelle. This exemplary wheel chart display comprises a partial wheel for each image variable with the wheels being centrally aligned and successively stacked, and with the wheels being rotatable relative to one another around a common axis. The representative values used for a variable are provided around the perimeter of the corresponding partial wheel such that the portion of each partial wheel that is not covered by an overlapping portion of another partial wheel can display the currently selected values of each image variable. As a further example, a similar mechanical display could be provided by a linear slide chart in which the display would comprise a linear strip for each of the image variables, with the strips being longitudinally aligned and partially overlapping, and with the strips being capable of longitudinal movement relative to one another. FIG. 13 further exemplifies the embodiment of FIG. 11 in a digital setting.

The image sensor (204) of the image capture device (200) is configured to detect the light that constitutes the image to be captured. For example, the image sensor (204) could comprise any of an electronic image sensor (e.g. a charge-coupled device (CCD) image sensor or an active-pixel sensor (APS)/CMOS image sensor) and a light-sensitive material (e.g. photographic film).

The shutter mechanism (205) is configured to control the length of time that light can enter the image capture device (200) and reach the image sensor (204). The shutter mechanism (205) could therefore comprise a conventional shutter mechanism as found in conventional image capture devices. For example, the shutter mechanism (205) could comprise one or more opaque curtains or leaves disposed in front of the image sensor (204) that block light from reaching the image sensor (204), and one or more actuators that move the curtains or leaves so as to expose the image sensor (204) once image capture has been initiated. Alternatively, an electronic image sensor can be constructed to emulate the function of a mechanical shutter mechanism.

The aperture mechanism (206) is configured to regulate the amount of light that passes through the lens of the image capture device and controls the depth of field. The aperture mechanism (206) could therefore comprise a conventional aperture mechanism as found in conventional image capture devices. For example, the aperture mechanism (206) could comprise an optical diaphragm that defines an aperture of variable diameter.

Figure 12:
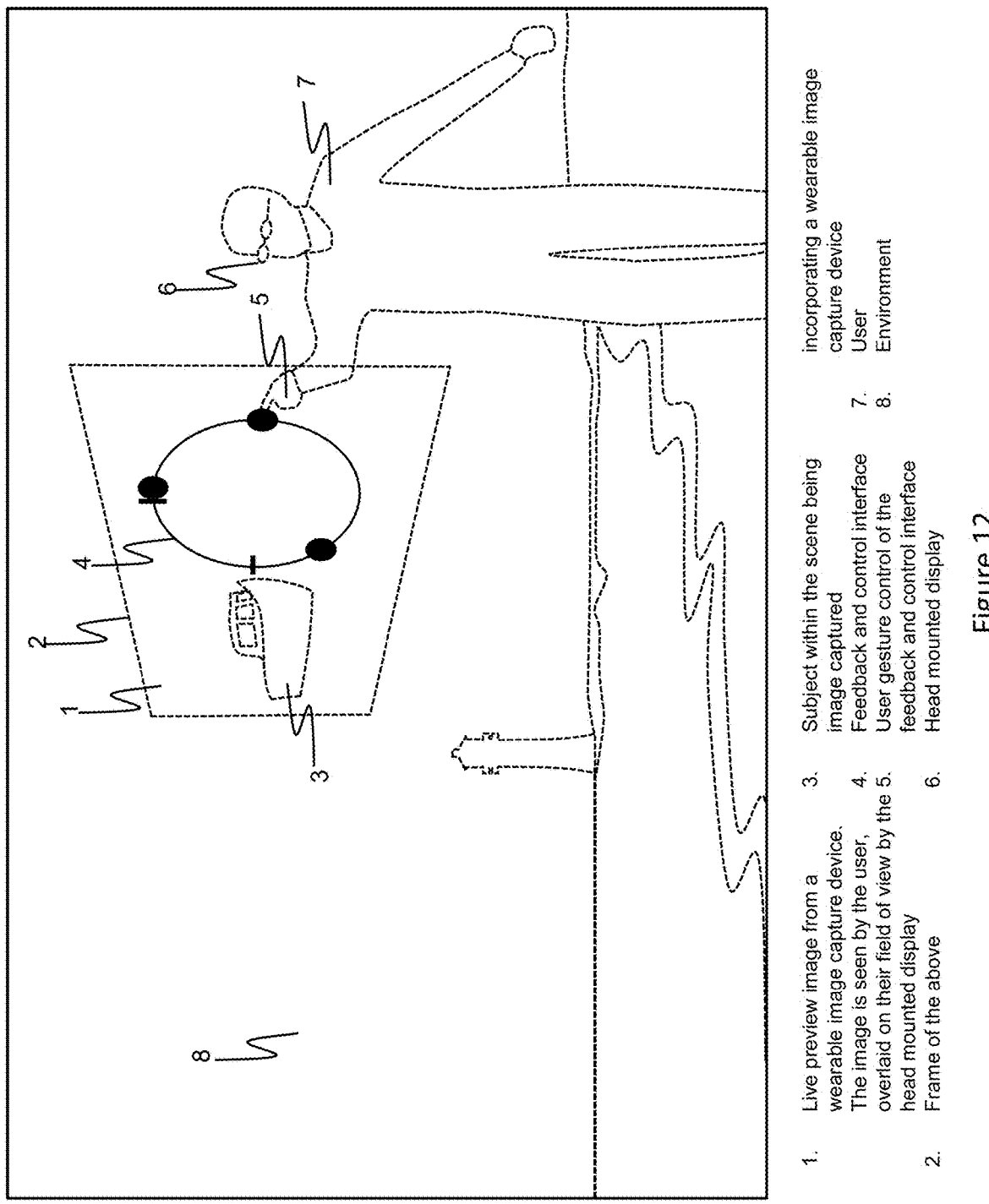
FIG. 12 illustrates a method of operating a wearable image capture device.

The user controls (207) are arranged to allow a user to control the attributes of the image capture device, to initiate the capture of an image, and to generally allow the user to interact with the image capture device. The user controls (207) could therefore comprise one or more of a touch screen, a touch pad, a voice-user interface, a gesture recognition device, a motion sensing device and manually operated user input devices (e.g. buttons, knobs, wheels, sliders, and switches). The use of such a gesture recognition device is shown in FIG. 12.

In some embodiments, the user controls (207) comprise a touch screen that allows the user to control/change the values representing each of the aperture size (D), shutter speed (T), and sensitivity (S) of the image capture device. In such embodiments it would be preferable the touch screen provide the functionalities of both the user controls (207) and the display (203) such that the user can control the attributes of the image capture device by touching the corresponding display elements displayed on the touch screen.

In another embodiment, the user controls (207) comprise three rotatable knobs/wheels, each of which can be used to control/change the values representing one of the aperture size (D), shutter speed (T), and sensitivity (S) of the image capture device. For example, in the embodiment illustrated in FIG. 10, three rotatable knobs/wheels are located adjacent to a hand grip located at one end of the image capture device (200) and are arranged so that each of these knobs/wheels can be easily operated by the thumb or forefinger of a user who is holding the image capture device (200) with the grip located in the palm of their hand. This embodiment provides that a user can easily control/adjust the values of each of the aperture size (D), shutter speed (T), and sensitivity (S) of the image capture device whilst holding the image capture device with either one or both hands.

If present, the light meter (208) is configured to determine a value for the scene luminance ($L_v$) by measuring the light reflected by the scene. The light meter (208) could therefore comprise a conventional light meter as found in conventional image capture devices. For example, the light meter (208) could comprise a photodetector that provides an output that is proportional to the average luminance of the detected light as a measure of the scene luminance.

If present, the transceiver (209) would be configured to transmit and receive information wirelessly. The transceiver (209) could therefore be used to communicate with external/peripheral control devices (211) and/or external/peripheral sensor devices (212). For example, the transceiver (209) could be used to communicate with a computer device (e.g. smart phone, tablet computer, smart watch, smart glasses etc.) that provides a peripheral display and/or set of user controls for the image capture device (200). In addition, or alternatively, the transceiver (209) could be used to communicate with a peripheral light meter.

If present, the hardware interface connection (210) would be configured to transmit and receive over a wired connection. The hardware interface connection (210) could therefore be used to communicate with external/peripheral control devices (211) and/or external/peripheral sensor devices (212). For example, the hardware interface connection (210) could take the form of a Universal Serial Bus (USB) or other standard connector that allows the external/peripheral control devices (211) and/or external/peripheral sensor devices (212) to be connected via a cable. The hardware interface connection (210) could then be used to communicate with a computer device (e.g. smart phone, tablet computer, smart watch etc.) that provides a peripheral display and/or set of user controls for the image capture device (200). In addition, or alternatively, the hardware interface connection (210) could be used to communicate with a peripheral light meter.

DETAILED EXAMPLES

As described above, the image variables all affect either the amount of light reaching the image sensor or the sensitivity of the image sensor. Consequently, the image variables will all affect the luminance/brightness of the image to be captured. The above described methods therefore recognise that by selecting an appropriate definition for the values that represent each of the image variables it is possible to define a relationship between these representative values in which their sum will be equal to a constant that corresponds to a particular image luminance/brightness. In particular, by making use of representative values that each positively correlate with the corresponding image variable, and therefore also positively correlate with the image luminance of the captured image, the sum of these representative values will be representative of the image luminance of the captured image and can therefore be compared with a pre-defined constant (X) that corresponds to a target image luminance/brightness. These values and their relationship to the image luminance/brightness can then be used to implement the methods of image capture described above to provide both improved control and improved feedback for the user of an image capture device.

This relationship between the image variables and the pre-defined constant (X) that corresponds to a target image luminance/brightness can therefore be expressed as:

$$L_r + A_r + S_r + T_r = X \quad \text{Formula 1}$$

where $L_r$ is the value that is representative of the scene luminance ($L_v$), $A_r$ is the value that is representative of the aperture size (D), $S_r$ is the value that is representative of the sensitivity (S), and $T_r$ is the value that is representative of the shutter speed/exposure time (T).

The following provides exemplary formulae for deriving representative values for each of the image variables and a corresponding value for the pre-defined constant (X) that corresponds to a target image luminance/brightness that is associated with an exposure that is typically considered to be correct.

In this specific example, $L_r$ is derived from the metered scene luminance ($L_v$) given in candelas/m² by the following formula:

$$L_r = 8 + \log_2(L_v/0.3K) \quad \text{Formula 2}$$

where K is the reflected light metering constant, usually taken to be 12.5 by most camera manufacturers.
$A_r$ is derived from the diameter (D) of the aperture given in millimetres (mm) by the following formula:

$$A_r = 9 - 2\log_2(f/D) \quad \text{Formula 3}$$

where f is the focal length of the lens.
$S_r$ is derived from the corresponding ISO rating for sensitivity (S) of the image sensor by the following formula:

$$S_r = \log_2(ISO/3.125) - 5 \quad \text{Formula 4a}$$

(alternatively described as $S_r = \log_2(S/3.125) - 5$ Formula 4b)

$T_r$ is derived from the exposure time (t) in seconds by the following formula:

$$T_r = 12 + \log_2(t) \quad \text{Formula 5}$$

When using representative values derived using these formulae a suitable value for the pre-defined constant (X) is 24. In this example, the value 24 corresponds to a sum of the representative values that results in a captured image having an average luminance equivalent to approximately 12% reflectance in visible light, which is often associated with an exposure that is typically considered to be correct. However, a value for the pre-defined constant (X) that corresponds to a sum of the representative values that results in a captured image having an average luminance equivalent of between 10% and 20% could be considered a correct exposure, although it is preferable that the value corresponds to between 12% and 18% reflectance in visible light. In this regard, 18% has conventionally been taught as corresponding to a 'correct exposure', whilst most manufacturers use a value of 12 or 12.5%.

It is then straightforward to provide the above described display and display components to display these representative values and the pre-defined constant (X) of 24. In particular, in an embodiment these representative values are each displayed using display elements in the form of a circular arc where the length of the arc is then proportional to the corresponding representative value, as illustrated in FIGS. 6a to 6d. When the sum of the representative values is equal to the pre-defined constant (X) of 24 then the substantially contiguously arranged display components extend around a circumference of a circle, as illustrated in FIGS. 6a and 6c.

In an embodiment, the display is provided as a touch screen so that the user can interact directly with each of the display elements. This provides the user with a simple and intuitive way to control the attributes of the image capture device whilst constantly receiving feedback as to the affect that changing these attributes will have on the image to be captured. In addition, this also provides a straightforward and intuitive process for implementing a semi-automated mode in which a change in one of these variable attributes by the user results in an automatic, consequential change in one of the other attributes. Specifically, when using a touch screen, a semi-automated control mode could be implemented by configuring the controls such that when the user touches and swipes one end of a display element corresponding to an attribute of the image capture device, this will change size (i.e. increase or decrease, depending upon the direction of the swipe) of the display element touched by the user (and the corresponding representative value and attribute of the device) and also the size of the display element that is adjacent to the end touched by the user (and the corresponding representative value and attribute of the device).

Consequently, this allows the user to make use of semi-automated mode simply by touching one end of a display element and provides that this semi-automated mode of control allows the user to effectively select which of the other attributes should be automatically and consequentially adjusted by choosing which end of the display element to touch. For example, in an embodiment in which the representative values are each displayed using display elements in the form of a circular arc, where the length of the arc is then proportional to the corresponding representative value, a user could touch the display element related to the time variable at a location proximate to the end that meets the display element related to the aperture variable and swipe to adjust the time variable. The image capture device could be configured such that this action implicitly indicates that user wishes to make use of shutter priority mode, in which the aperture is automatically adjusted so as to ensure that the sum of the representative values is equal to the pre-defined constant (X).

The device could then be configured to implement a full manual mode when the user touches and swipes a display element away from either of its two ends. In this case, only the display element touched by the user will change in size (i.e. increase or decrease, depending upon the direction of the swipe).

It is also envisaged that this straightforward method of implementing semi-automated mode could be provided using a mechanical controls. By way of example, the image capture device could be provided with three dials/wheels for controlling the image variables relating to the camera attributes, one for each of the. aperture size (D), sensitivity (S), and exposure time (T)). Implementing a preferred semi-automated mode could then be achieved by configuring one or more of the dials/wheels to also act as a button wherein a single press of the dial/wheel selects a corresponding semi-automated mode. The dial/wheel can then be used to set the representative value for the corresponding image variable. For example, pressing the aperture wheel would select aperture priority mode, whilst pressing the exposure time wheel would select shutter priority mode. Alternatively, each of the dials/wheels could be provided by two dials/wheels stacked one above the other, where rotating the top dial selects a first semi-automated mode, rotating the bottom dial selects a second semi-automated mode, and rotating both dials together selects manual mode.

It will be appreciated that individual items described above may be used on their own or in combination with other items shown in the drawings or described in the description and that items mentioned in the same passage as each other or the same drawing as each other need not be used in combination with each other. In addition, the expression "means" may be replaced by actuator or system or device as may be desirable. In addition, any reference to "comprising" or "consisting" is not intended to be limiting in any way whatsoever and the reader should interpret the description and claims accordingly.

Furthermore, although the invention has been described in terms of embodiments as set forth above, it should be understood that these embodiments are illustrative only. Those skilled in the art will be able to make modifications and alternatives in view of the disclosure which are contemplated as falling within the scope of the appended claims. In particular, whilst the above described examples have been described in relation to their use in image capture devices, the skilled person will recognise that various features of the above described embodiments will be equally applicable to other, including non-imaging, devices, such as image processing devices, image viewing devices, standalone light meters and exposure calculators, and in wearables and augmented reality devices, or in any device comprising one or more variables to be controlled in conjunction with each other.

For example, the above described methods could be implemented by image processing devices during post-processing of images in order to provide user control and feedback when editing images. As a further example, the above described methods could be implemented by standalone light meters and exposure calculators in order to provide user control and feedback when using such devices to determine the attributes of an image capture device that should be used to capture an image. As a yet further example, aspects of the above described methods could be implemented by image viewing devices when displaying images such that the images are accompanied by the above described display elements thereby illustrating the image variables used to the capture the image.

Moreover, whilst the above described examples have been described in relation to their use in conventional image capture devices, it is equally applicable to image capture devices that make use of 'computational imaging' techniques in combination with multiple camera/lens modules. In this regard, computational imaging is an approach that allows the benefits of a conventional, relatively large electronic image sensor to be achieved through a combination of many small electronic image sensors whose individual low-information images may be computationally combined to form a large-information image. For example, a 3×3 array of small electronic image sensors (12 mm×9 mm) has the same combined area and therefore a similar amount of light and information can be gathered as from a single full frame sensor (36 mm×24 mm). However, the array of relatively small electronic image sensors can be arranged to be much flatter and occupy a much smaller volume than that of a full frame sensor. Images captured using computational imaging can have synthetic grain blur (which positively correlates with the sensitivity of the image sensor), motion blur (which positively correlates with the exposure time), and background blur (which positively correlates with the aperture size) applied in order to recreate the effects achievable with conventional image capture devices. The above described methods could therefore be implemented when applying synthetic exposure effects to images captured using computational imaging.

In addition, these methods could be adapted to provide further benefits in such circumstances. For example, as synthetic exposure effects do not need to have a corresponding increased effect on image luminance/brightness, each of the synthetic exposure effects could be represented on a display using their own display elements, which are separate/distinct from those display elements representing the image variables of the captured image. Increasing or decreasing any of these synthetic exposure effects would then be configured to cause a positively correlated increase or decrease in a dimension of the corresponding, distinct display elements. However, the distinct display elements representing each of the synthetic exposure effects could be offset relative to the display elements representing the image variables of the captured image, thereby illustrating that changes in the synthetic exposure effects do not affect the image luminance/brightness.

Although some of the embodiments described above with reference to the drawings comprise computer apparatus and processes performed in computer apparatus, it is envisaged that the methods and apparatus described mean that any aspects extend to computer programs, particularly computer programs on or in a carrier, adapted for putting the invention into practice. The program may be in the form of source or object code or in any other form suitable for use in the implementation of the processes/apparatus of any aspect. The carrier could be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

It is understood that image variables can comprise positive or negative values. For example, in the case of imaging devices, each of the image variables used for exposure can occupy a range from infinitely positive values to infinitely negative values.

When an image variable changes to a negative value, the display component correspondingly is displayed as a negative value. Hence it starts at the end of the preceding value, but rather than continuing positively and contiguously, the display component travels negatively along the same dimension. This negative travel may be represented as a backwards movement of the display when compared with the direction of travel for a positive value. Display components may, as in the case of negative values, be offset and hence follow the path of a different radius around the same circle, so as to ensure that the contiguously arranged values do not obscure one another.

When an image variable changes to zero value the display component may be arranged correspondingly to shrink to a zero value and hence disappear. However it is advantageous to provide a way to indicate to a user where the image variable display component is, even if it is at a zero value. The user may wish to control the variable to change it to a non-zero value in the future.

Further, in the context of an imaging device, different exposure variables may all contribute to a final image brightness. These exposure variables can include: scene luminance, aperture size, time, and sensitivity. In addition to these image variables, image brightness can be increased with computational imaging techniques such as through combining, or "stacking" multiple images of the same scene. For example, two images will double the image brightness, and 16 images will double image brightness 4 times. This may be represented as $1*2^4$.

Although it will be appreciated that a range of variable values may be used, a table of exemplary values is shown in FIG. 14.

FIG. 13 shows example images created using selected values from the table of FIG. 14, for example,
Luminance—64 cd/m², $L_r=12$
Sensitivity—ISO 400, $S_r=2$
Aperture—f/8, $A_r=3$
Time—1/30 second, $T_r=7$ Each variable in the abovementioned Formula 1 of $L_r+A_r+S_r+T_r=X$ may be defined by its own equation that converts each value from traditional metrics. This may include a different numbering system for exposure and a new scale for each of its constituent metrics ($L_r$, $A_r$, $S_r$, $T_r$, and X). For each metric a rate of change and a baseline or zero value is defined.

It is desirable that a common standard be established for these metrics and the numbering system as a whole.

While the scale of each metric may be set arbitrarily, there are numerous consequences or constraints for each of the design choices of scaling of each metric and the interaction between these. Accommodating these constraints can lead to a numbering system and to a set of scaled metrics that are no longer arbitrary. There is a limited latitude to change the scale and baseline of the metrics, but the tabulated values above represent a balance based on the constraints.

It is an objective of the arrangement disclosed herein to provide the ability for users to:
quickly build familiarity with the values of each variable and the technical effect that each represents;
make rapid visual assessments of the current value of each image variable;
make rapid visual assessment of the brightness of the final image relative to the target image brightness, thereby determining whether the final image is too dark, too bright, or correctly exposed; and/or
mentally compute interactions between the image variables and the pre-defined constant (X), thus aiding planning settings to be made.

In one embodiment, the pre-defined constant (X) may be defined as 24. This is a value sufficiently large to accommodate a wide range of scene luminances and variables of $S_r$, $A_r$, and $T_r$, while also remaining small enough for a typical user to perform mental arithmetic to sum the image variable values to arrive at an image brightness value.

In embodiments having a substantially circular interface, such as a doughnut chart, target total values of either 12 or 24 are desirable owing to:
familiarity of today's population with a 12 or 24 unit configuration on a circular display device (i.e. clocks);
the value 24 being highly divisible, i.e. by any of the integers 1, 2, 3, 4, 6, or 8;
The ease of a user being able to visually judge the position and size of image variables relative to the cardinal points of the compass (the 6, 12, 18, and 24 position); and
The use of exponents with a common base of 2.

Each image variable is expressed as the exponent value to a common base, and in this embodiment a base of 2. This allows for an elegant equation of $X=L_r+S_r+A_r+T_r$, as disclosed above. For the majority of conventionally used values, the image variables are positive values. In the circular embodiment this may achieve a clear feedback and control interface of a circle whose constituent display components all progress, with each one positively following the next. The user may also be supported through the use of relatively straightforward mental arithmetic of image variables, and the clear visual judgment in relation to the size and position of image variables.

In the example case where all the variable values are positive, they do not double back on themselves and therefore provide an uncluttered control interface that is easy to touch the desired display element without accidentally touching a parallel display element. If a value goes negative it indicates to the user that this is unusual and is outside the normal range.

The image sensors on many conventional modern cameras have a base sensitivity of between ISO 50 and ISO 200. ISO 100 occupies a particular role in setting the baseline for measuring exposure value EV (which in this example is set to EV100). When S has a zero value ("S0"), it may seem to disappear, or at least remain unobtrusive, in the user interface, thereby reducing the number of image variables on display and allowing additional focus by the user on the remaining values. This may be instrumental in keeping the user interface ("UI") as uncluttered as possible. In this example, S0 is set between ISO 25 and ISO 400.

In the abovementioned example, Time T0=1/4,000 seconds ("sec"). 1/8,000 sec to 1/2,000 sec is considered an approximate range of commercially available mechanical shutter speeds on cameras today. Electronic shutter speeds can be appreciably faster.

Setting S0 at 1/4,000 in combination with X=24 leads to a sequence of values where natural inflections measured in time that relate to travelling quarter arcs around the UI circle. Points may be provided that are easy for a user to remember, for example: 1/4,000=0 (empty circle), 1/60 sec=6 (quarter circle), 1 sec=12 (half circle), 1 min=18 (three quarters circle), or 60 min=24 (full circle). An exemplary value to set T0 is between 1/1,000 sec and 1/64,000 sec.

In the abovementioned example, the Aperture A0=f22. The range of values on variable aperture cameras is conventionally able to be set from f2 to f16, with more specialist lenses operable to expand that range from f1 to 45. This range is defined by the physical constraints of optics laws. Diffraction is considered aesthetically unacceptable for very high f numbers and lenses become impractically heavy and expensive at values below f1. An exemplary value to set A0 is between f45 and f16.

Setting luminance L0=0.016 cd/m² is equivalent to that of a scene illuminated by a full moon. A majority of images are taken in lighting conditions within a range equivalent to naturally lit conditions of a full moon through to full sun on snow. This is approximately a 19-stop range of luminance (19 doublings). Photographs are conventionally taken more frequently in lighting conditions within this range than in scenes that are either dimmer or brighter than the range. Setting a zero baseline for the luminance scale as equivalent to 16 cd/m² can provide sufficient space on the circular interface arrangement to accommodate positive luminance values up to the brightest natural conditions (for example, full sun on snow) and leave space for one or more of the remaining image variables to have non-zero, positive values. An exemplary value of L0 is between 0.016 cd/m² and 0.004 cd/m².

Image stacking may be performed using different methods. Images can be taken from the same imagining device separated over time, or images can be taken from an array of different cameras at the same time, or a combination of the two. Each method results in different image aberration, also referred to as "blur".

It has been known to provide a positive user experience in practice to give a user something recognisable as a "touchable" item. Touch tabs may conventionally be used as icons at the end of each display component for the user to touch. Where touch tabs are used, their size may contribute to the size of the display component as it extends along the dimension in which display components are contiguously arranged.

An imaging device, such as a camera, can be linked to a head mounted display that provides visual feedback to the user. This display may be used in combination with abovementioned gesture controls wherein the user sees a virtual version of the control interface and is able to control it using one or more gestures.

It will further be appreciated that the abovementioned use of the disclosed method is for example purposes only, and a generic form of any method, apparatus, system, or kit of parts disclosed herein may be used.

When technology is used by people, there is conventionally a user interface challenge. A user interface solution is therefore provided for a subset of these user interface challenges. The solution disclosed herein may be used in relation to technologies that have multiple input variables that combine to achieve an overall effect. This may be referred to as the "total primary effect". The individual variables may each also have a secondary effect. Such technologies may include input variables which either sum or a multiply to impact the total primary effect.

In one embodiment, for example imaging, there are input variables comprising: light, aperture, time, and sensitivity. All of these contribute to the total primary effect of image brightness. These variables also each have secondary effects of; background blur, motion blur, grain blur. The input variables multiply one upon the other to achieve final image brightness.

Each input variable can be expressed using exponentiation, comprising a base and an exponent. By using a common base across all the input variables, each variable's exponent may be used to represent its value.

Because all variables use a common base, the total primary effect can be calculated by summing the exponents of each input variables. In the imaging example a base of 2 is used. That is the increments between aperture sizes are doublings, and likewise the increments between time values are doublings (e.g. 1/1000 sec, 1/500 sec, 1/250 sec, etc). Thus an example of multiplying four variables could look as follows:

$$2^{12}*2^3*2^3*2^6=2^{24}$$

This may be simplified to:

$$12+3+3+6=24$$

This formula can then be embodied in a display and control device. Thus an information and control feedback loop is provided. The display of information reflects the underlying physics of the device or system being controlled. It provides the user with a model from which to understand and fluently control what are otherwise a complex set of interdependent variables. It provides an intuitive control interface that matches the physics and/or design of the information system. The "circle" of variables generated in the case of imaging can be considered as a visualisation of the formula governing final image brightness.

Technological systems such as these allow for multiple, even infinite, arrangements of input variables that all deliver the same total primary effect. To further illustrate with imaging, an infinite variation of settings for light, aperture, time, and sensitivity can be combined to deliver the same total primary effect of image brightness. However the secondary effects of the input variable will be very different. Thus the user has a complex optimisation problem to solve.

Therefore there is generated a complex set of conditions. Without suitable feedback it is difficult to intuit: a level of each variable (relative to some baseline); a relationship of each of the input variables on the total primary effect; or the relationship of each input variable to each other.

Further examples are also provided. A common theme in the examples below is that the "circle" display is used to give an energy reading. Any of brightness, audio volume, and thermal comfort may be considered as energy related.

In the use case for a violin, the volume of a violin can be increased by four methods; bow speed, bow pressure, proximity of bow to the bridge, and angle of bow. While all four variables contribute to volume (the total primary effect) they also have their own very different effects on the quality of the sound:

Faster bowing increases volume and makes a 'harsher' sound;

Pressure of the bow on the strings increases volume and creates a 'fuller' sound;

Playing with the bow close to the bridge increases volume and creates a 'broader' sound; and The angle of the bow determines how many strings are played. More strings increase volume and add more notes that are being played.

Each of these variables can be recorded in real time, for example through a smartphone or computer tablet application, and may be displayed as a circular display arrangement on a screen as disclosed herein. The practicing violinist could then receive visual feedback to reinforce what they feel and hear that they are doing. The variables could be measured through sensors on the instrument that give relative position and angle of the bow to the violin or a microphone and computer listening for the effect of these.

In relation to other audio-related uses, there are many ways to manipulate audio data. One subset of controls comprises: volume and volume of specific frequency bands (bass, mid, and treble tones). These relate to frequency bands of low, mid and high frequency. Volume, also referred to as loudness, may be considered a measure of sound pressure which in turn is a summation of the energy level of all frequencies of sound. Increasing any one of the frequency bands, base, mid, or treble, will increase the volume of that band and will increase the total primary effect of overall volume.

In the use case for thermal comfort, the method disclosed herein may be used as a component of a control interface for thermal comfort in a smart home. Input variables that contribute to the total primary effect of thermal comfort may include from the environment: air temperature, air speed, radiant heat, relative humidity and they further include from the person; metabolic rate, clothing, personal calibration/response, skin dryness/sweating, speed of person through air, and psychological factors.

In the case of a smart house where heating, air conditioning, humidity, blinds/radiation, and ventilation air speed are controlled, the householders may be equipped with a wearable device, such as a smart watch or glasses that detect the user's metabolic rate, clothing worn, skin dryness, and movement. Empirical readouts of one or more of the inputs contributing to thermal comfort can be calculated. The user may be presented with a display/input device that illustrates a summary of these inputs and gives the user control over the smart-house controls in a convenient way. For example, there may be a target power consumption desired or other capacity or "budget" for desired output—this is used to set the total value X—and then the variables that contribute to this can be set out as the portions of the interactive display component, for example the doughnut chart sections, which can then be modified by a user to set the power settings for some smart-house systems—e.g. air-conditioning, battery charging—but some variables may be fixed and determined by actual current consumption—e.g. current power draw for essential systems such as refrigeration.

By using a circular waterfall chart that is both a user feedback and control device, control may be afforded over a plurality of input variables as well as over the total primary effect. By using a circular embodiment, a clear end point is provided when the path reaches all the way back round to the origin. By way of comparison, a linear display of information conventionally requires markers to indicate the end and possibly the beginning of a sequence. Further, the human mind often finds it more manageable to judge the comparative length of a circular arc than the length of straight line segments. It may be understood at a glance the proportions approximating to ¼, ½, ¾, and a full circle and are able to judge values in between these, as well as detecting if a circle is incomplete or complete.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

The invention claimed is:

1. A feedback and control method of operating an image capture device operable to capture an image of a scene, the device having a visual display, the method comprising:
   determining values that are representative of each of a plurality of image variables, the variables comprising one or more of aperture size (D), shutter speed (T), sensitivity (S) of an image sensor of the image capture device, and scene luminance (L) for the scene, wherein the variables comprise factors that impact on the image luminance of an image to be captured;
   representing each of the image variables on the visual display using a display component, wherein a dimension of each display component is proportional to the value that is representative of the corresponding image variable, and wherein the display components representing each of the image variables are arranged substantially contiguously such that when the sum of the values is equal to a pre-defined constant (X), which corresponds to a target image luminance for the image to be captured, the substantially contiguously arranged display components extend between an origin point on the display and a target end point on the display, wherein each display component comprises a shape shown on the display for which the dimension that is proportional to the value that is representative of the corresponding image variable extends between a first end to a second end of the display component, and wherein the display components are arranged such that the first end of a display component corresponding to one of the image variables is adjacent to the second end of an immediately preceding display component;
   receiving an input that changes a value that is representative of one of the image variables and consequentially adjusting both the corresponding display component and a corresponding attribute of the image capture device; consequentially adjusting one or more other values that are representative of one or more other variables so that the sum of the values is equal to the pre-defined constant (X); for each of the values that have been adjusted, adjusting the display component that corresponds to the adjusted image variables; and capturing of an image using the image variables as changed by the receiving of the input.

2. The method of claim 1, wherein the target end point is indicated on the display by a further display component.

3. The method of claim 1, wherein the display components comprise correspondingly shaped elements shown by the display.

4. The method of claim 1, wherein each of display components comprises a circular arc shown on the display, and wherein the length of the arc is proportional to the value that is representative of each image variable.

5. The method of claim 4, wherein when the sum of the representative values is equal to the pre-defined constant (X) the substantially contiguously arranged display components extend around a circumference of a circle.

6. The method of claim 1, wherein each of display components comprises any of a line and parallelogram shown on the display, and wherein the length of the line or parallelogram is proportional to the value that is representative of each image variable.

7. The method of claim 1, wherein, for any of the values that have been adjusted that are representative of an image variable that is associated with an attribute of the image capture device, adjusting both the display component and attribute of the image capture device that corresponds to the adjusted value.

8. The method of claim 1, wherein the factors comprise attributes of an image capture device and conditions that affect scene luminance of the scene.

9. The method of claim 1, wherein the variables further comprise flash intensity (F) and optical density of any neutral density filters (ND).

10. The method of claim 1, wherein the pre-defined constant (X) corresponds to a sum of the representative values that results in a captured image having an average luminance equivalent to between 10% and 20% reflectance in visible light, and preferably between 12.5% and 18% reflectance in visible light.

11. The method of claim 1, wherein the values that are representative of each of the variables each positively correlate with the corresponding variable.

12. The method of claim 1, wherein the values that are representative of each of the variables positively correlate with the image luminance of the captured image.

13. The method of claim 1, and further comprising:
   receiving a user input that initiates the capturing of an image using one or more image variables as changed by the receiving of the input.

14. The method of claim 1, wherein the step of determining values that are representative of each of a plurality of variables comprises:

obtaining initial values from each of one or more inputs of the image capture device, wherein the inputs are obtained from one or more of user controls of the image capture device, external device connections, and sensors of the image capture device.

15. The method of claim 1, wherein the step of representing each of the image variables on a display using a display component comprises any of:

for each of the variables, generating a corresponding display component on an electronic visual display of the image capture device; and for each of the variables, providing a corresponding display component of a mechanical display.

16. A non-transitory computer readable medium storing computer interpretable instructions which when interpreted by a programmable computer cause the computer to perform a method in accordance with claim 1.

17. An image capture device that is arranged to capture an image of a scene, the image capture device comprising:

an image sensor;
a plurality of inputs;
a display; and
a processor;
wherein the processor is configured to:

determine values that are representative of each of a plurality of image variables, wherein the plurality of image variables comprises one or more of aperture size (D), or shutter speed (T), or sensitivity (S) of an image sensor of the image capture device, in addition to the scene luminance (L) for the scene;

represent each of the image variables on the display using a display component, a dimension of each display component being proportional to the value of the corresponding image variable, and the display components representing each of the image variables being arranged substantially contiguously such that when the sum of the image variables is equal to a pre-defined constant (X) which corresponds to a target image luminance for the image to be captured, the substantially contiguously arranged display components extend between an origin point on the display and a target end point on the display, wherein each display component comprises a shape shown on the display for which the dimension that is proportional to the value that is representative of the corresponding image variable extends between a first end to a second end of the display component, and wherein the display components are arranged such that the first end of a display component corresponding to one of the image variables is adjacent to the second end of an immediately preceding display component;

receive an input that changes one of the values that is representative of one of the image variables, consequentially adjust one or more other values that are representative of other image variables so that the sum of the image variables is equal to the pre-defined constant (X) and, for each of the values that have been adjusted, to adjust the display component that corresponds to the adjusted image variables; and cause the image sensor to capture an image using the current image variables.

18. The image capture device of claim 17, wherein the inputs comprise user controls of the image capture device.

19. The image capture device of claim 18, wherein the user controls of the image capture device comprise one or more of a touch screen, a touch pad, a voice-user interface, a gesture recognition device, a motion sensing device and manually operated user input devices.

20. The image capture device of claim 18, wherein the inputs further comprise one or more of external device connections, and sensors of the image capture device.

21. The image capture device of claim 17, wherein the display comprises any of an electronic visual display and a mechanical display.

22. The image capture device of claim 17, wherein the image capture device comprises a camera device providing the image sensor and a peripheral control device providing the display and one or more of the plurality of inputs, the peripheral control device and the camera device being configured to communicate with one another.

23. The image capture device of claim 22, wherein the processor is provided by any of the camera device and the peripheral control device.

\* \* \* \* \*